US012669480B2

(12) United States Patent
Hori et al.

(10) Patent No.: US 12,669,480 B2
(45) Date of Patent: Jun. 30, 2026

(54) ANNULAR-A CHARACTERIZATION FOR INNER TUBULAR ECCENTRICITY AND WAVE PROPAGATION SPEED ESTIMATION

(71) Applicant: Schlumberger Technology Corporation, Sugar Land, TX (US)

(72) Inventors: Hiroshi Hori, Clamart (FR); Roel Van Os, Clamart (FR); Orland Guedes, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 278 days.

(21) Appl. No.: 18/588,181

(22) Filed: Feb. 27, 2024

(65) Prior Publication Data

US 2024/0288404 A1     Aug. 29, 2024

Related U.S. Application Data

(60) Provisional application No. 63/487,326, filed on Feb. 28, 2023.

(51) Int. Cl.
*G01N 29/07*          (2006.01)
*G01N 29/11*          (2006.01)

(52) U.S. Cl.
CPC ............. *G01N 29/07* (2013.01); *G01N 29/11* (2013.01); *G01N 2291/044* (2013.01); *G01N 2291/106* (2013.01)

(58) Field of Classification Search
None
See application file for complete search history.

(56) References Cited

U.S. PATENT DOCUMENTS

| | | | |
|---|---|---|---|
| 4,594,691 | A | 6/1986 | Kimball |
| 5,216,638 | A | 6/1993 | Wright |
| 5,859,811 | A | 1/1999 | Miller |
| 6,483,777 | B1 | 11/2002 | Zeroug |
| 7,149,146 | B2 | 12/2006 | Kuijk |
| 7,423,930 | B2 | 9/2008 | Valero |
| 7,522,471 | B2 | 4/2009 | Froelich |

(Continued)

FOREIGN PATENT DOCUMENTS

EP          2757391 A2      7/2014

OTHER PUBLICATIONS

Abshire, L. W. et al. "Offshore Permanent Well Abandonment" Oilfield Review, 2012, 24(1), pp. 42-50.

(Continued)

*Primary Examiner* — Suman K Nath
(74) *Attorney, Agent, or Firm* — Jeffrey D. Frantz

(57)          ABSTRACT

Determining eccentricity and its direction of an inner tubular (e.g., tubing, liner, inner casing, etc.) in a cased hole using pulse-echo signals that are acquired in, for example, a dual-string cased well, being pre-processed for enhancing echo signals from the outer annular boundary and for reducing the inner tubular specular echo and pipe ringing. Disclosed methods also provide propagation speeds, of the signals traversing the annular materials between the inner tubular and outer annular boundary, that is used to identify annular material (e.g., production fluids, brine, water, cement, collapsed formation, etc) and one of the input parameters for dual-string cement evaluation.

17 Claims, 14 Drawing Sheets

(56)          References Cited

U.S. PATENT DOCUMENTS

| | | | |
|---|---|---|---|
| 9,927,541 B2 | 3/2018 | Kinoshita | |
| 10,012,749 B2 | 7/2018 | Bose | |
| 10,138,727 B2 | 11/2018 | Zeroug | |
| 10,156,653 B2 | 12/2018 | Lemarenko | |
| 10,345,465 B2 | 7/2019 | Lemarenko | |
| 10,838,727 B2 | 11/2020 | Das | |
| 11,378,709 B2 | 7/2022 | Steinsiek | |
| 2018/0045031 A1* | 2/2018 | Shaposhnikov | E21B 33/14 |
| 2021/0247538 A1* | 8/2021 | Guedes | G01S 15/8945 |
| 2021/0311224 A1 | 10/2021 | Cozon | |
| 2022/0146701 A1 | 5/2022 | Lemarenko | |
| 2024/0085583 A1 | 3/2024 | Garcia Roman | |

OTHER PUBLICATIONS

Bose, S. et al. "Acoustic Evaluation of Annulus B Barriers Through Tubing for Plug and Abandonment Job Planning" OTC-31302-MS, presented at the 2021 Offshore Technology Conference, Virtual and Houston, Texas, 23 pages.

Brill, T. M. et al. "Electromagnetic Casing Inspection Tool for Corrosion Evaluation", IPTC 14865, presented at the International Petroleum Technology Conference, Bangkok, Thailand, 2012, 14 pages.

Haldorson, J. B. U. et al. "Characterizing borehole plumbing using full-waveform ultrasonic data: Application to data from a North Sea well" Geophysics, 2016, 81(6), 11 pages.

Hayman, A. J. et al. "High-Resolution Cementation And Corrosion Imaging By Ultrasound", SPWLA 32nd Annual Logging Symposium, Jun. 16, 1991, 25 pages.

Kiran, R. et al. "Identification and evaluation of well integrity and causes of failure of well integrity barriers (A review)" Journal of Natural Gas Science and Engineering, 2017, 45, pp. 511-526.

Klieber, C. et al. "A calibration-free inversion algorithm for evaluating cement quality behind highly contrasting steel pipe" IEEE International Ultrasonics Symposium, 2016, 4 pages.

Klieber, C. et al. "Visualization of Leaky Ultrasonic Lamb Wave Experiments in Multilayer Structures" International Congress on Ultrasonics, Physics Procedia, 2015, 70, pp. 314-317.

Mahaut, S. et al. "Study of complex ultrasonic NDT cases using hybrid simulation method and experimental validations", Insight 2011, 53(12), pp. 664-667.

Thierry, S. et al. "New-Generation Ultrasonic Measurements for Quantitative Cement Evaluation in Heavy Muds and Thick-Wall Casings", SPE-181450-MS, presented at the 2016 SPE Annual Technical Conference and Exhibition, Dubai, UAE, 25 pages.

Thierry, S. et al. "Ultrasonic Cement Logging: Expanding the Operating Envelope and Efficiency", SPWLA-2017-WWWW, presented at the 58th Annual Logging Symposium, Oklahoma City, OK, 2017, 22 pages.

Van Kuijk, R. et al. "A Novel Ultrasonic Cased-Hole Imager for Enhanced Cement Evaluation", IPTC-10546-MS, presented at the 2005 International Petroleum Technology Conference, 14 pages.

Viggen, E. M. et al. "Analysis of outer-casing echoes in simulations of ultrasonic pulse-echo through-tubing logging", Geophysics, 2016, 81(6), 7 pages.

Viggen, E. M. et al. "Simulation and modeling of ultrasonic pitchcatch through-tubing logging" Geophysics, 2016, 81(4), pp. D383-D393.

Wang, H. et al. "Understanding acoustic methods for cement bond logging" The Journal of the Acoustical Society of America, 2016, 139(5), pp. 2407-2416.

Zeroug, S. et al. "Sonic and ultrasonic measurement applications for cased oil wells", Insight-Non-Destructive Testing and Condition Monitoring, 58(8), Aug. 2016, pp. 423-430.

Zeroug, S. "Analytical Modeling for Fast Simulations of Ultrasonic Measurements on Fluid-Loaded Layered Elastic Structures" IEEE Transactions on Ultrasonics, Ferroelectrics, and Frequency Control, 2000, 47(3), pp. 565-574.

Combined Search and Exam report issued in Great Britain Patent Application No. GB2402789.8 dated Jul. 31, 2024, 6 pages.

* cited by examiner

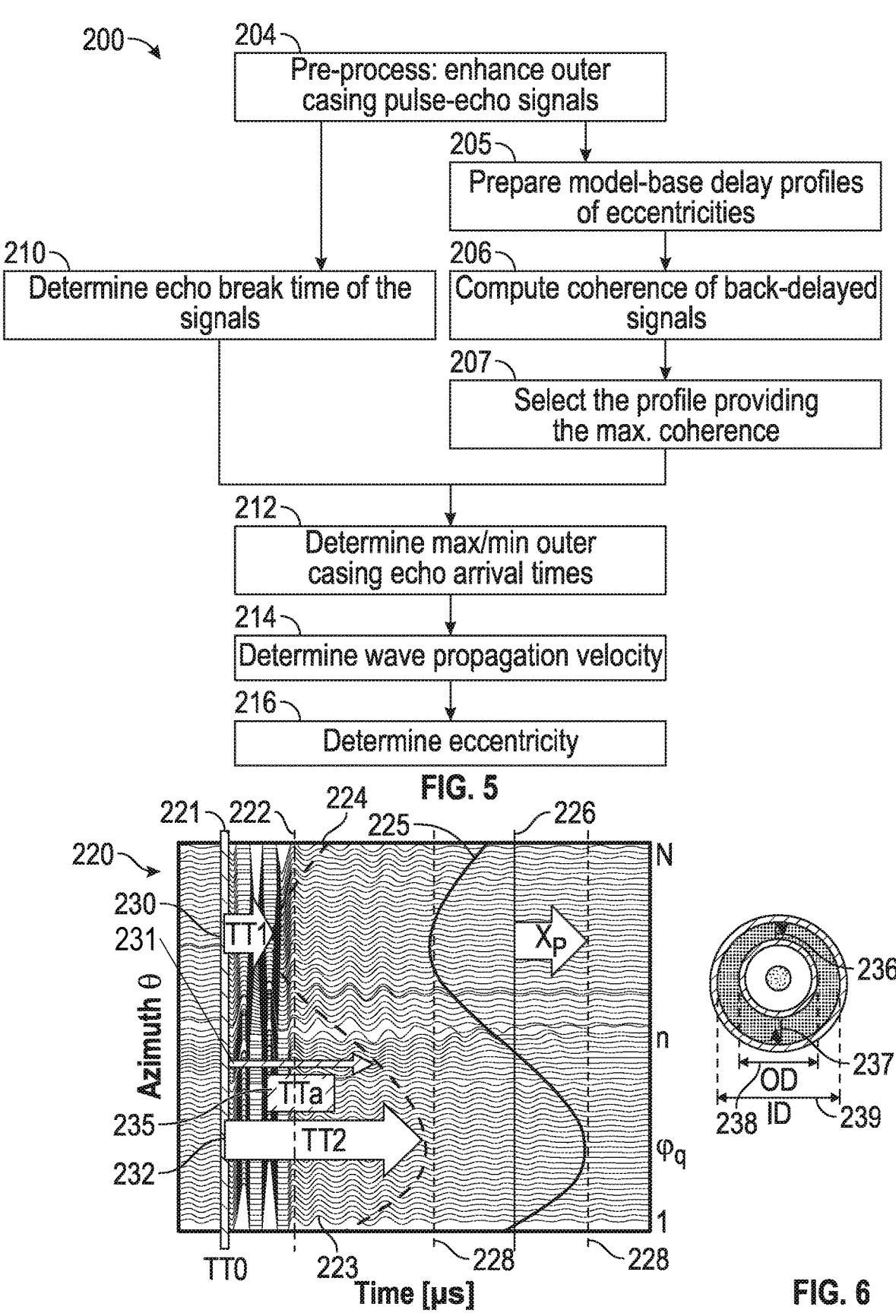

200

204
Pre-process: enhance outer casing pulse-echo signals

205
Prepare model-base delay profiles of eccentricities

210
Determine echo break time of the signals

206
Compute coherence of back-delayed signals

207
Select the profile providing the max. coherence

212
Determine max/min outer casing echo arrival times

214
Determine wave propagation velocity

216
Determine eccentricity

Azimuth θ

TT1

TTa

TT2

X$_P$

N n

φ$_q$

1

TT0    223    228    228

Time [μs]

NORMALIZED & ALIGNED WAVEFORM & ENVELOPE

NATURAL LOG - CASING RINGING ENVELOPE FIT.

INNER TUBULAR RING-DOWN SIGNAL & ITS MODEL SIGNAL

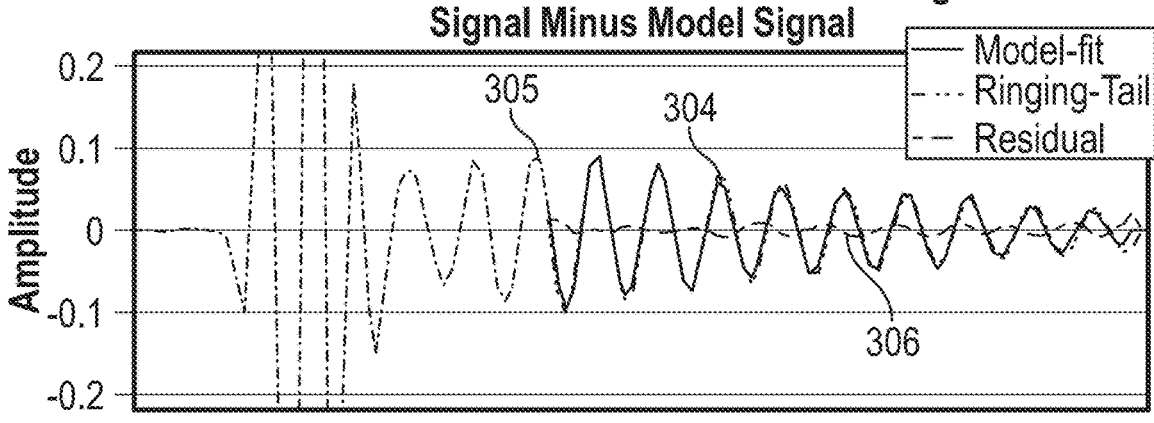
FIG. 22
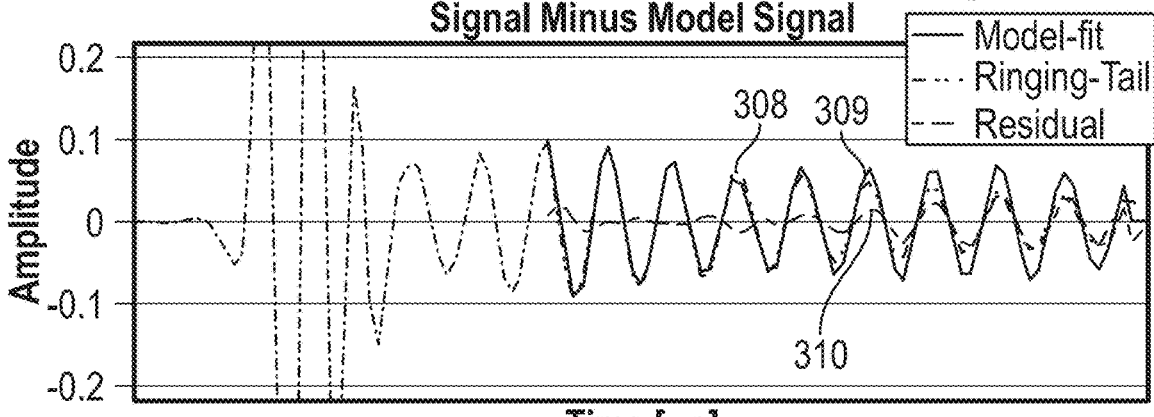
FIG. 23
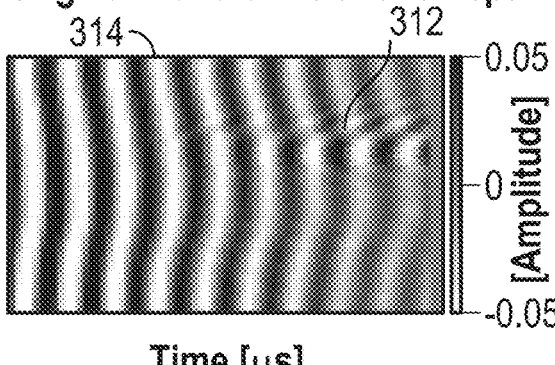
FIG. 24
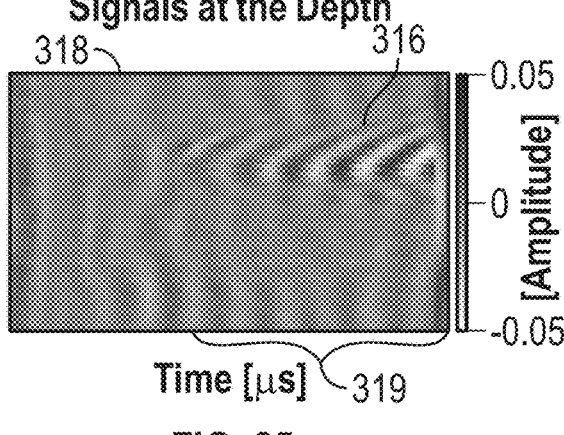
FIG. 25

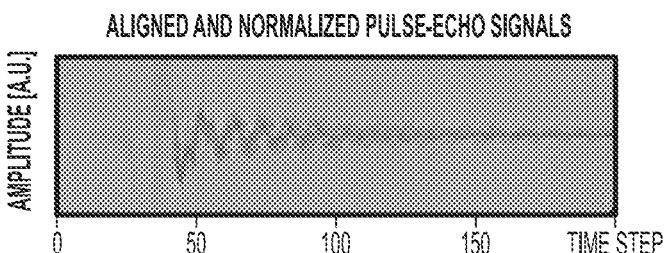
ALIGNED AND NORMALIZED PULSE-ECHO SIGNALS
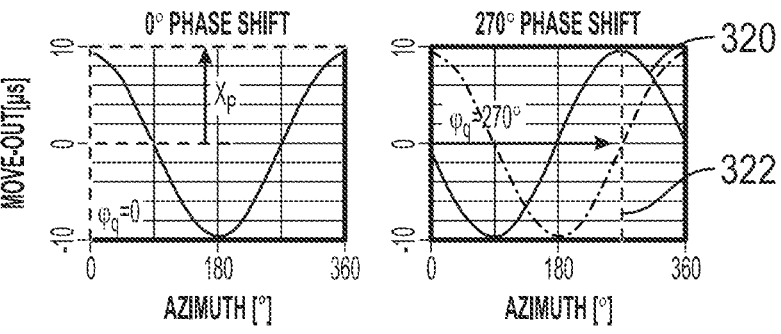
EXAMPLE MODEL MOVEOUTS
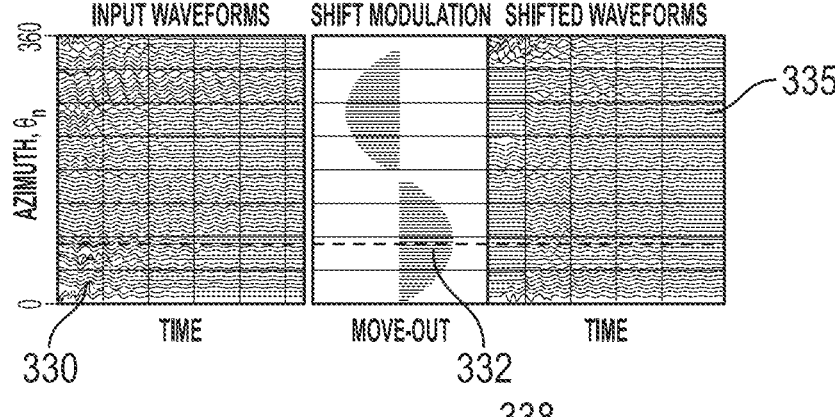
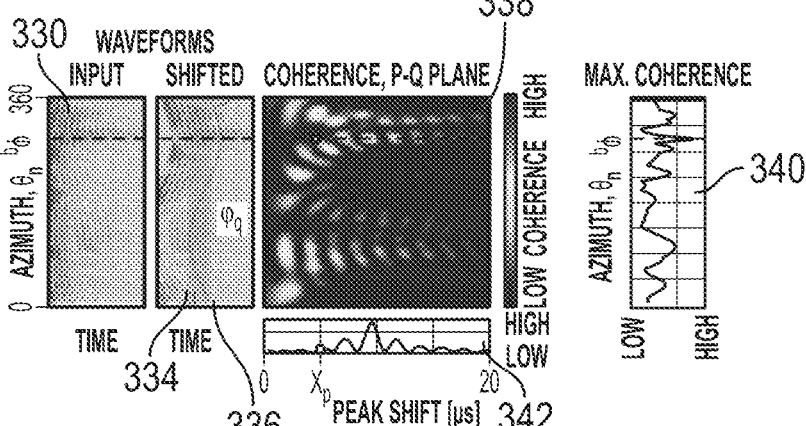
FIG. 26

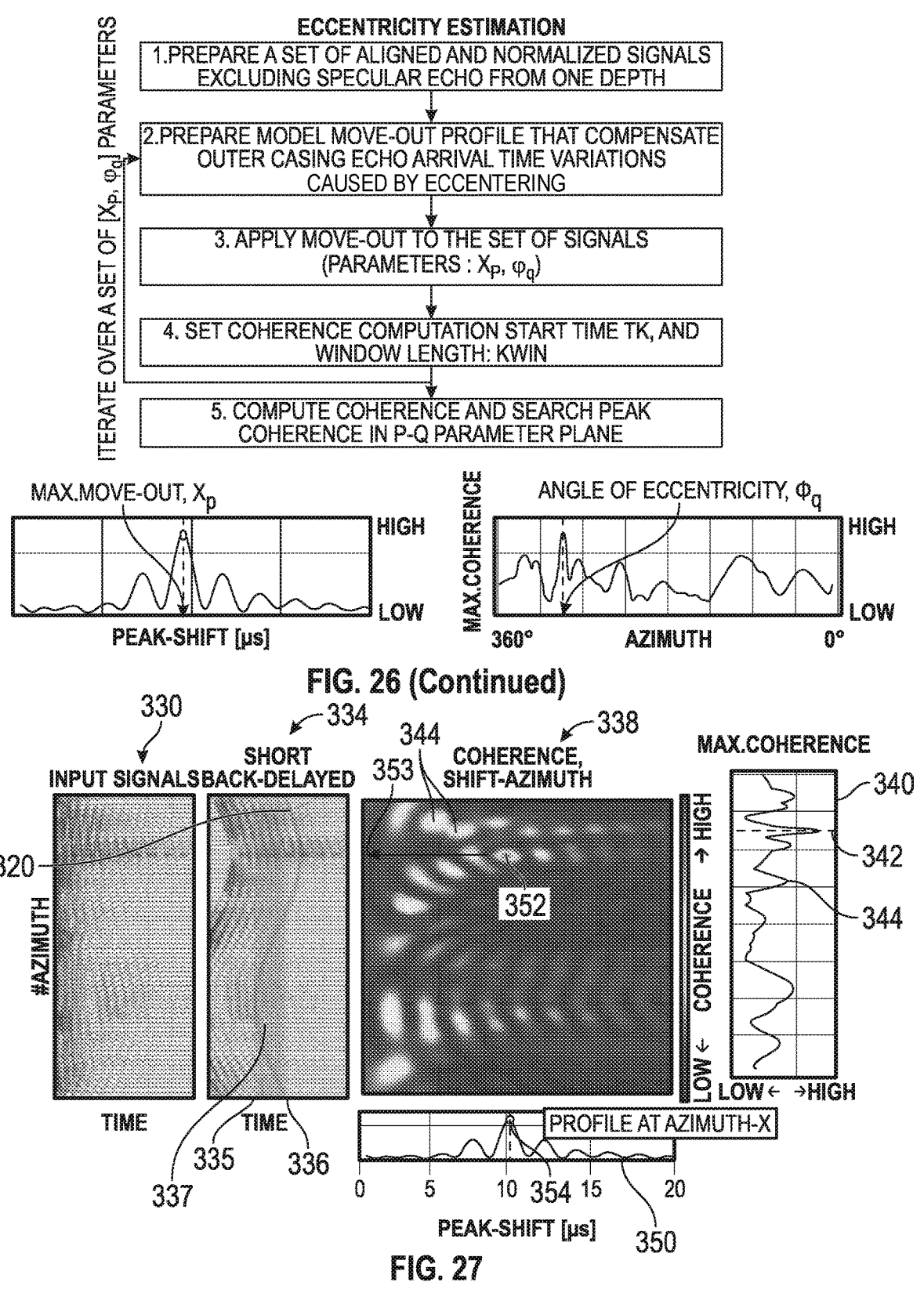

ECCENTRICITY ESTIMATION

ITERATE OVER A SET OF $[X_p, \varphi_q]$ PARAMETERS

1. PREPARE A SET OF ALIGNED AND NORMALIZED SIGNALS EXCLUDING SPECULAR ECHO FROM ONE DEPTH

2. PREPARE MODEL MOVE-OUT PROFILE THAT COMPENSATE OUTER CASING ECHO ARRIVAL TIME VARIATIONS CAUSED BY ECCENTERING

3. APPLY MOVE-OUT TO THE SET OF SIGNALS (PARAMETERS : $X_p$, $\varphi_q$)

4. SET COHERENCE COMPUTATION START TIME TK, AND WINDOW LENGTH: KWIN

5. COMPUTE COHERENCE AND SEARCH PEAK COHERENCE IN P-Q PARAMETER PLANE

MAX.MOVE-OUT, $X_p$

HIGH

LOW

PEAK-SHIFT [µs]

MAX.COHERENCE

ANGLE OF ECCENTRICITY, $\Phi_q$

HIGH

LOW

360° AZIMUTH 0°

MAX.COHERENCE

INPUT SIGNALS SHORT BACK-DELAYED

353

COHERENCE, SHIFT-AZIMUTH

340

320

342

AZIMUTH

352

COHERENCE

344

TIME TIME

HIGH

LOW 335 336

337

PROFILE AT AZIMUTH-X

LOW ← → HIGH 0 5 10 354 15 20

PEAK-SHIFT [µs]

ANNULAR-A CHARACTERIZATION FOR INNER TUBULAR ECCENTRICITY AND WAVE PROPAGATION SPEED ESTIMATION

CROSS-REFERENCE TO RELATED APPLICATION

This application claims priority to U.S. Provisional Patent Application No. 63/487,326, filed on Feb. 28, 2023, which is incorporated by reference herein.

BACKGROUND OF THE DISCLOSURE

Inner tubulars are placed in oil and gas production wells as a conduit of hydrocarbon, to securely lift it from downhole reservoir to the surface production system. When hydrocarbon production comes to an end, oil and gas wells are plugged by cement, sometimes removing the inner tubulars and casings to seal hydrocarbon passing from the reservoir. Well conditions including cement and casing qualities, are utilized to perform casing cutting and cementing operations of the wells, known as plugging and abandonment.

SUMMARY OF THE DISCLOSURE

The present disclosure introduces aspects for determining eccentricity and orientation of an inner tubular (e.g., tubing, liner, inner casing, etc.) in an outer casing using pulse-echo signals that are acquired in, for example, a dual-string cased well. Disclosed methods also provide propagation speeds, of the signals traversing the annular materials between the inner tubular and outer casing, that may be used to identify annular material (e.g., production fluids, brine, water, cement, collapsed formation, etc).

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 5 is a flow-chart diagram of at least a portion of an example implementation of a method according to one or more aspects of the present disclosure.

FIG. 6 is a graphic diagram accompanying FIG. 5.

FIGS. 18-23 are graphs each depicting one or more aspects of the present disclosure.

FIGS. 24 and 25 are VDL images of inner tubular pulse-echo signals before and after initial inner tubular ring-down removal.

FIG. 26 depicts at least a portion of an example implementation of an eccentering estimation data flow according to one or more aspects of the present disclosure.

FIGS. 27-29 demonstrate coherence computation results in the p-q plane using three different sections of test well.

DETAILED DESCRIPTION

Figure 1:
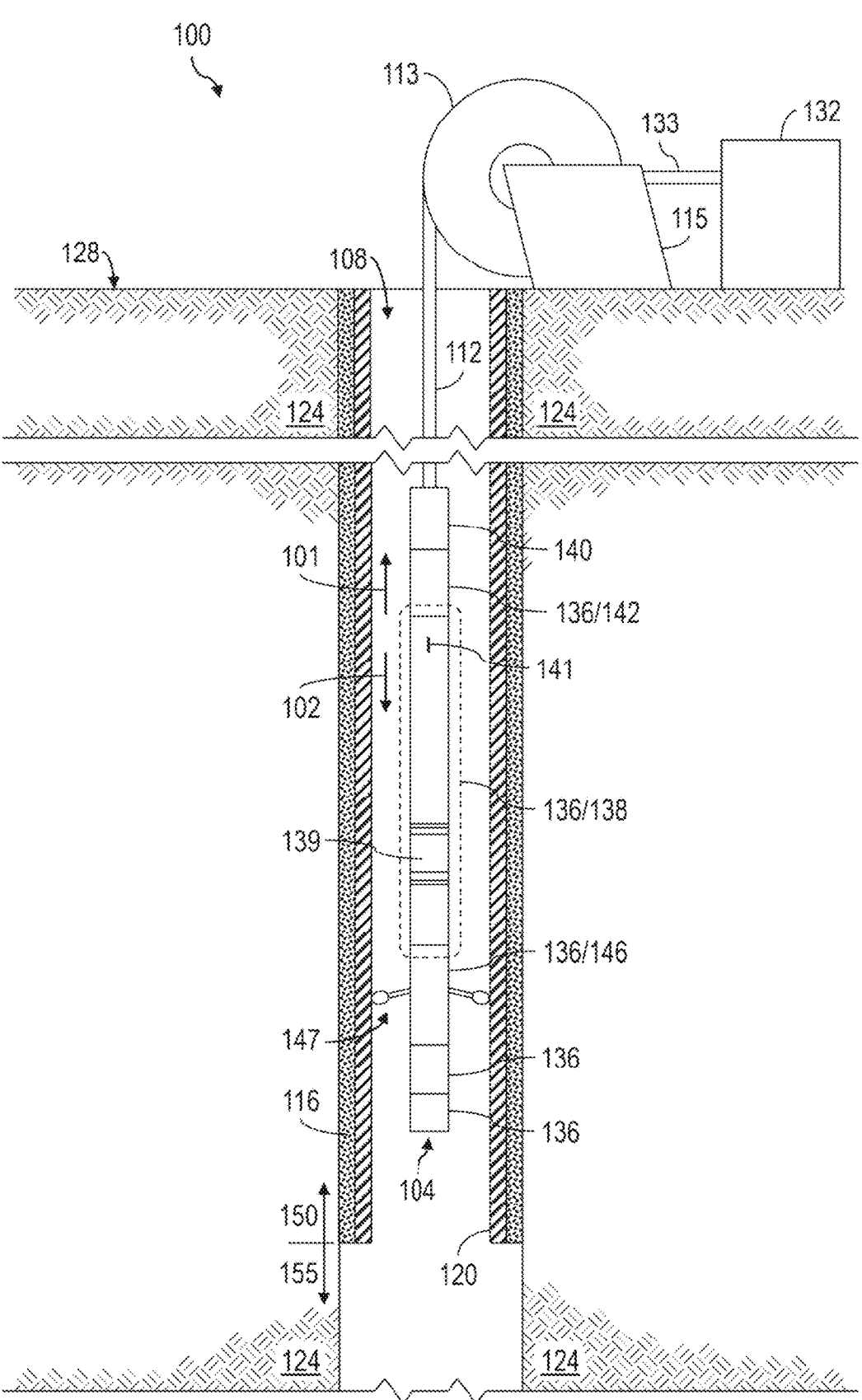
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example implementation of a wellsite system 100 to which one or more aspects of the present disclosure may be applicable. The wellsite system 100 may be onshore (as depicted) or offshore. In the example wellsite system 100 shown in FIG. 1, a tool string 104 is conveyed in a borehole 108 via a wireline, slickline, and/or other conveyance means 112. The example wellsite system 100 may be utilized for evaluation of the borehole 108, cement 116 securing casing 120 within the borehole 108, a tubular (not shown) secured in the casing 120 (e.g., production services tubing), and/or a subterranean formation 124 penetrated by the borehole 108 in cased 150 or/and open hole 155 sections. The major part of the wellbore is shown as a "cased wellbore" but may be open hole (without cement or casing secured to the formation).

The tool string 104 is suspended in the borehole 108 from the lower end of the conveyance means 112. The conveyance means 112 may be a single- or multi-conductor slickline or wireline logging cable spooled on a drum 113 of a winch 115 at the surface 128 of the wellsite from whence the borehole 108 extends. The wellsite surface 128 is the generally planar surface of the terrain (i.e., Earth's surface), a floor of a rig (not shown) at the wellsite, or other equipment at the wellsite, which is perpendicularly penetrated by the borehole 108. Operation of the winch 115 rotates the drum 113 to reel in the conveyance means 112 and thereby pull the tool string 104 in an uphole direction 101 in the borehole 108, as well as to reel out the conveyance means 112 and thereby move the tool string 104 in a downhole direction 102 in the borehole 108. The conveyance means 112 may include at least one or more conductors (not shown) that facilitate data communication between the tool string 104 and surface equipment 132 disposed at the wellsite surface 128, including through one or more slip rings, cables, and/or other conductors (schematically depicted in FIG. 1 by reference number 133) electrically connecting the one or more conductors of the conveyance means 112 with the surface equipment 132. The conveyance means 112 may alternatively transport the tool string without a conductor inside the cable but with at least one module that can autonomously acquire and/or process and/or store downhole measurements in downhole memory without human intervention or communication with the surface equipment 132.

Although not illustrated as such in FIG. 1, the winch 115 may be disposed on a service vehicle or a stationary skid/platform. The service vehicle or stationary skid/platform may also contain at least a portion of the surface equipment 132.

The tool string 104 comprises a plurality of modules 136, one or more of which may comprise an elongated housing and/or mandrel carrying various electronic and/or mechanical components. For example, at least one of the modules 136 may be or comprise at least a portion of a device for measuring a feature and/or characteristic of the borehole 108, the casing 120, a tubular installed in the casing 120 (not shown), the cement 116, and/or the formation 124, and/or a device for obtaining sidewall or inline core and/or fluid (liquid and/or gas) samples from the borehole 108 and/or formation 124. Other implementations of the downhole tool string 104 within the scope of the present disclosure may include additional or fewer components or modules 136 relative to the example implementation depicted in FIG. 1.

The wellsite system 100 also includes a data processing system that may include at least a portion of one or more of the surface equipment 132, control devices and/or other electrical and/or mechanical devices in one or more of the modules 136 of the tool string 104 (such as a downhole controller 140), a remote computer system (not shown), communication equipment, and/or other equipment. The data processing system may include one or more computer systems or devices and/or may be a distributed computer system. For example, collected data or information may be stored, distributed, communicated to a human wellsite operator, and/or processed locally (downhole or at surface) and/or remotely.

The data processing system may, whether individually or in combination with other system components, perform the methods and/or processes described below, or portions thereof. For example, the data processing system may include processor capability for collecting caliper, acoustic, ultrasonic, and/or other data related to the evaluation of the cement 116, the casing 120, a tubular installed in the casing 120 (not shown), and/or the formation 124, according to one or more aspects of the present disclosure. Methods and/or processes within the scope of the present disclosure may be implemented by one or more computer programs that run in a processor located, for example, in one or more modules 136 of the tool string 104 and/or the surface equipment 132. Such programs may utilize data received from the downhole controller 140 and/or other modules 136 and may transmit control signals to operative elements of the tool string 104, where such communication may be via one or more electrical or optical conductors of the conveyance means 112. The programs may be stored on a tangible, non-transitory, computer-usable storage medium associated with the one or more processors of the downhole controller 140, other modules 136 of the tool string 104, and/or the surface equipment 132, or may be stored on an external, tangible, non-transitory, computer-usable storage medium that is electronically coupled to such processor(s). The storage medium may be one or more known or future-developed storage media, such as a magnetic disk, an optically readable disk, flash memory, or a computer-readable device of another kind, including a remote storage device coupled over one or more wired and/or wireless communication links, among other examples.

As designated in FIG. 1 by reference number 138, at least one of the modules 136 may be or comprise a acoustic or ultrasonic tool operable for acquiring acoustic or ultrasonic pulse-echo signals for characterizing the borehole 108, the casing 120, a tubular installed in the casing 120 (not shown), the cement 116, the formation 124, etc, at more than one circumferential position or azimuth of the borehole, while mechanically rotating at least one ultrasonic transducer or alternatively an electrically driven ultrasonic phased-array transducer 139, at azimuthal directions relative to the azimuthal tool reference referred as a tool face or tool key 141. Time and the azimuthal directions of the pulse echo signal acquisitions are controlled by the tool 138 and recorded together with the signals to map measured data to borehole azimuth and depth. The one or more modules 136 may also include an orientation module permitting measurement of the azimuth of the tool 138. Such module may include, for example, one or more of relative bearing (RB) or gravity/acceleration, magnetometer and gyroscope sensors.

As designated in FIG. 1 by reference number 146, another one (or more) of the modules 136 may be or comprise a centralizer module. For example, the centralizer module 146 may comprise an electric motor driven by a controller (neither shown) and/or other means for actively extending ("opening") and retracting ("closing") a plurality of centralizing arms 147. Although only two centralizing arms 147 are depicted in the example implementation shown in FIG. 1, other implementations within the scope of the present disclosure may have more than two centralizing arms 147. Extension of the centralizing arms 147 aids in urging the acoustic or ultrasonic tool 138 to a central position within the casing 120, another tubular, or the borehole 108 being investigated by the acoustic or ultrasonic tool 138. Implementations of tool strings within the scope of the present disclosure may include more than one instance of the acoustic or ultrasonic tool 138 and/or more than one instance of the centralizer module 146. The modules 136 may be conveyed in either or both of open hole 150 and cased hole 155 sections, including implementations in which the centralizer module 146 and the acoustic or ultrasonic module 138 may be configured or configurable for use in either or both of the two sections. The tool string 104 may also be deprived of centralizer module 146. The centralizing arms 147 depicted in FIG. 1 is just an example implementation, which does not limit other alternative structures such as rubber standoffs or fins, or a ring-shape protrusion from the tool 146 in built-in or mechanically detachable form.

Figures 2, 3, 4:
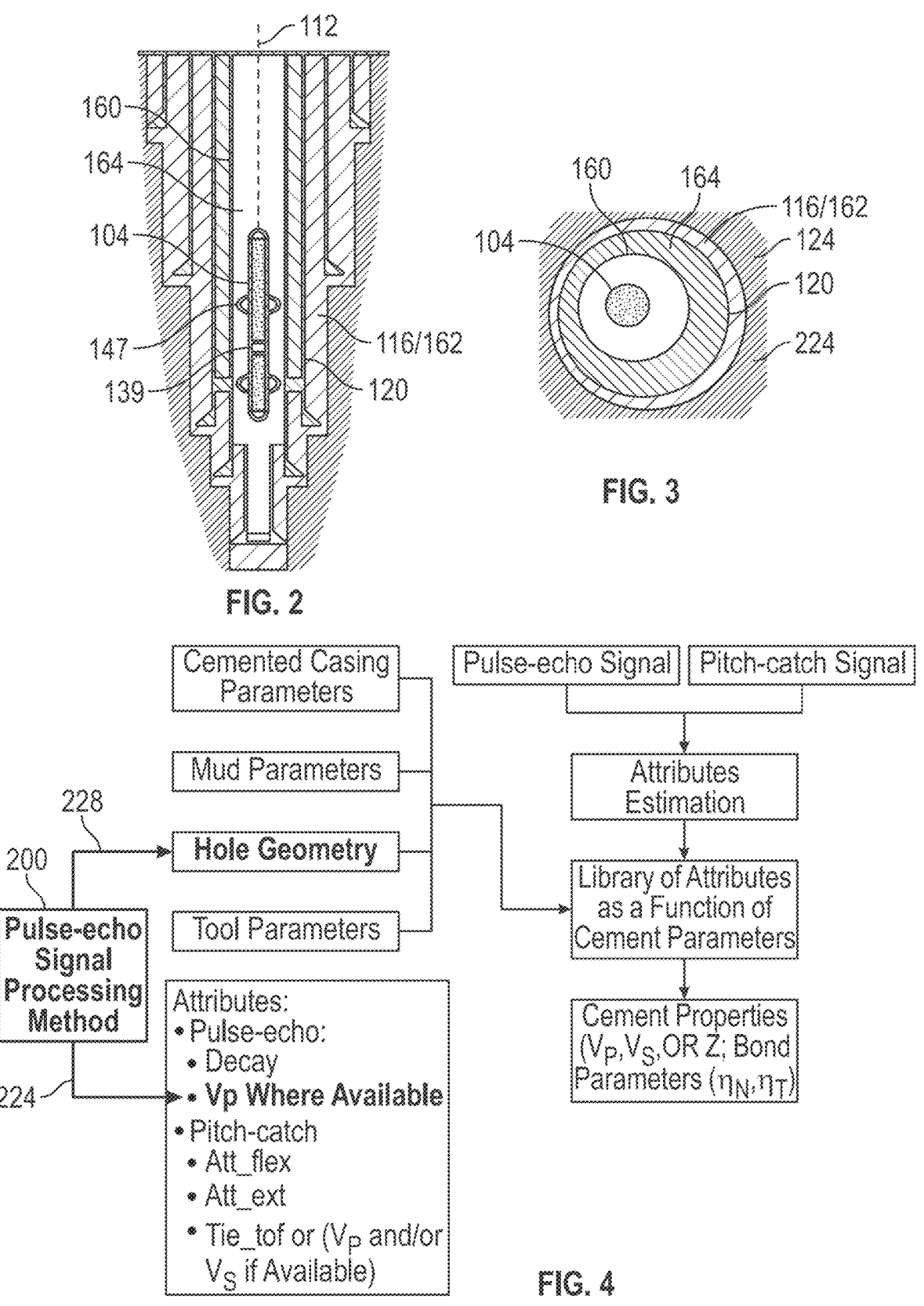
FIG. 2 is a schematic view of at least a portion of an example implementation of apparatus according to one or more aspects of the present disclosure.
FIG. 3 is a schematic view of at least a portion of an example implementation of apparatus according to one or more aspects of the present disclosure.
FIG. 4 is a flow-chart diagram of at least a portion of an example implementation of an example method, for dual-string cement evaluation method disclosed in the prior art U.S. Ser. No. 10/838,727.

The equipment depicted in FIG. 1 may also be utilized in implementations in which the tool string 104 is conveyed within a tubing installed inside the casing 120, as depicted in FIGS. 2 and 3. In such implementations (among others), qualities of the cement, qualities of the inner and outer casings, and other well conditions are utilized to perform casing cutting and cementing operations of the wells, known as plugging and abandonment (P&A), among other purposes. For example, new technologies for dual-string P&A evaluation, such as combing sonic and ultrasonic measurements to identify cement quality of the outer-casing (so called B-annulus), is described in U.S. Pat. No. 10,138,727, the entirety of which is hereby incorporated herein by reference. Such technology utilizes ultrasonic casing flexural third interface echo (TIE) signals to provide inner tubular eccentricity. Ultrasonic casing flexural logging and TIE signal processing are also described in U.S. Pat. Pub. 2022/0146701, the entirety of which is hereby incorporated herein by reference. Availability of flexural logging data may be limited depending on cement evaluation services requested and availability of the measurements depending on casing dimensions. Moreover, in dual-string well with the annular material of high-density cement, that has its compressional wave propagation velocity faster than the inner tubular flexural wave propagation speed, the dominant flexural TIE signals propagate at the speed of shear wave speed of the cement, as it is taught in the prior art U.S. Pat. No. 7,522,471. Measurement of the compressional wave propagation speed is no longer available from the flexural TIE signals in such high-density cement. On the other hand, the pulse-echo TIE is propagating at compressional velocity in such high-density cement. Compressional wave propagation speed measurement becomes uniquely available from the pulse-echo measurement in the high-density cement.

FIG. 2 is a schematic sectional view of at least a portion of an example implementation in which the tool string 104 is deployed within a tubular 160 that has been installed within the casing 120. Although not depicted in FIG. 2, one of the modules 136 of the tool string 104 is a pulse-echo tool that receives signals from the tubular 160 and the casing 120. FIG. 3 is an axial view of the casing 120, the tubular 160 within the casing 120, and the tool string 104 within the tubular 160. FIGS. 2 and 3 each depict an outer annulus (B-annulus) 162 defined between the casing 120 and the formation 124 and filled with cement 116, as well as an inner annulus (A-annulus) 164 defined between the casing 120 and the tubular 160. The materials in the inner and the outer annuli 164, 162 may be one of followings but are not limited to, cement, fluid, hydrates, gels, segregated solid of drilling mud or solid of collapsed formation 124 depending on wells and their depth intervals.

FIG. 4 is a flow-chart diagram of the prior art U.S. Ser. No. 10/138,727 that teaches a method of dual string cement evaluation. In the prior art, time of flight of third interface echo (TIE_TOF) of pitch-catch measurement is used to estimate inner tubular eccentricity in the outer casing. Compressional velocity Vp of annular material was indicated but no detailed methods were disclosed to provide accurate estimation, except the way of enhancing the outer casing TIE signals using "bin processing" disclosed in the prior art U.S. Pat. No. 5,859,811 This invention is related to new and detailed method for estimating the inner tubular eccentricity in the outer casing as a part of hole geometry 228, also for estimating compressional wave propagation speed (Vp 224) of the annular material, that can be used as additional input parameters to the dual-string cement evaluation. Outer casing TIE enhancement method is also different from the one disclosed in U.S. Pat. No. 5,859,811 that requires multiple waveforms, while the new enhancement method disclosed in this invention is waveform-by-waveform processing that does not require multiple signals. Pulse-echo TIE_TOF will also provide a way of controlling quality of the inner annulus acoustic impedance measurement, that is disclosed in the prior art U.S. Pat. No. 5,216,638. Accurately estimated Vp can be also used to identify A-annulus material types, to discriminate water, brine, production fluid, mud and solid in combination with the acoustic impedance (U.S. Pat. No. 5,216,638).

Alternative to conventional cement-evaluation tools [e.g. PowerEcho, or PowerFlex], a cement evaluation tool using a phased-array ultrasonic transducer (e.g., having one or more aspects as described in U.S. Pat. Pub. 2021/0247538 and/or U.S. Pat. Pub. 2021/0311224, the entireties of which are hereby incorporated herein by reference) can provide pulse-echo measurements in tubulars and casings. As for the conventional tools, pulse-echo measurements of such a phased-array cement evaluation tool provide ultrasonic cement evaluation, which can be combined with sonic measurements (e.g., according to one or more aspects described in U.S. Pat. No. 9,927,541, the entirety of which is hereby incorporated by reference) to provide cement evaluation service in dual-string wells.

Inner tubular eccentering estimation ability, together with averaged compressional wave propagation velocity in the inner annulus, disclosed herein is presented in the context of dual-string cement evaluation for P&A services. However, aspects introduced herein may also be utilized in other applications. The methods disclosed herein use semblance or coherence computation, not from inverted attributes (such as acoustic impedance of annular material or casing thickness) and their images, but by searching for move-outs or back-propagating delay parameters that compensate the outer casing echo delay caused by the outer casing eccentricity relative to the inner tubular, in a way that back-propagated signals provide maximize coherence. In this invention, the terms, "move-out", "back-propagate", "delay-back" or "beam-form" will be used to indicate signal time-shifting operation, either forward or backward, for compensating signal arrival time variation resulting from signal acquisition at different geometrical positions relative to the pulse-echo target, for example, the outer casing of the dual string in an eccentered condition. Coherence computation is of the examples semblance identification method, and does not limit using alternatives such as cross-correlation.

FIG. 5 is a flow-chart diagram of at least a portion of an example implementation of a method 200 of data processing according to aspects of the present disclosure. FIG. 6 provides a schematic illustration in accompaniment with the method 200. In FIG. 6, a set of example pulse-echo signals 230 that are acquired in the time-domain, targeting multiple circumferential positions of the inner tubular 160 surface while an ultrasonic tool 138 conducts measurement in one turn. The signals 230 are presented with vertical offset for visualization. The horizontal and vertical axes of the graph are respectively time and azimuthal angle θ relative to the tool reference 141. The signals 230 are pre-processed 204, applying at least one of following: 1) alignment of inner tubular echo arrival time 231 at the constant time of TT0, 2) band-pass filtering to remove undesirable signal including noise, 3) minimizing the inner tubular resonance using an example method disclosed in FIG. 16 250. Specular echo from the inner surface of the inner tubular 160 appears as the largest amplitude signals in the time range indicated by a thick vertical solid line 221 and dotted line 222. Following inner tubular resonance 223 are nearly vertically aligned. On top of the inner tubular ringing, outer casing TIE signals are visible as sinusoidally varying arrivals 210, 224 in time, which are inner tubular resonance signals reflected back from the inner surface of the outer casing 120. These sinusoidally varying arrivals 210, 224 are modulated in complex manner due to the interference with the inner tubular resonance and azimuthally varying outer casing TIE signals. Amplitude of the outer casing echo is smaller than the specular echo of the inner tubular (between 231 and 232) and its amplitude is expected typically a few percent of the specular. The minimum and the maximum outer casing TIE break time, i.e. TT1 230 and TT2 232 are present at the azimuth of eccentricity 236 and its opposite side 237. The outer casing arrival at TT1 is not visible due to order of magnitude larger specular echo and its residual after pre-processing 204. The outer casing arrival at TT2 is much better visible than the one at TT1, but still not dominating the inner tubular resonance or ring-down. This example is in a cemented inner tubular, so that outer casing TIE is clearly visible without applying inner tubular resonance signal estimation and removal shown from FIG. 16 to FIG. 25. After pre-processing the pulse-echo signals 204 in FIG. 5, one can prepare a set of azimuthally varying time-shift profiles 205 based on models 225, for examples, ray-path, numerical forward modeling, such as finite element, finite difference, spectral element or semi-analytical green function based modeling techniques. In example waveforms 230, time-shift peak value to compensate the eccentricity delay is $X_p$ 226, and its azimuth angle $\varphi_q$. One can back-propagate or apply time-shift that inverses the time delay caused by the casing eccentricity, then compute coherence of the waveforms of circumferential waveforms at N azimuths 206. As the result, one can obtain the maximum coherence as the outer-casing TIE are in-phase and well aligned after back-propagation operation 207. Coherence processing, applied to the entire N or a sub-group of signals provides robust eccentricity estimation thanks to coherent signal over relatively long-duration of time window. Coherence processing can identify the maximum and minimum delay range indicated by two dashed lines 228, however, it is 0challenging to identify first arrival or break time near TT1 due to relatively large specular echo signal residual. One can determine outer casing echo break-time estimation process 210 and estimate the break time at TTa 235, at one azimuth index n (one of 1, 2, 3, . . . N−1, N). If the break time estimation is successful at multiple azimuths but with relatively large fluctuation, one can apply statistical method, such as median or mode, to obtain reliable azimuthal outer casing break time 224, from which one can obtain the minimum and maximum outer casing echo arrival times 212. Using a priori knowledge of the casing inner diameter and the tubular outer diameter, e.g. nominal values of API, one can compute compressional wave propagation velocity 214. and the outer casing eccentricity 216. Each processing details and examples of the invention 200 is disclosed in following sections.

The method 200 includes pre-processing 204 the pulse-echo signals obtained by the pulse-echo tool of the tool string 104. Eccentricity parameters, peak time delay $X_p$ and its angular position $\varphi_q$ are then found. One waveform is then selected 212 at azimuth $\theta_n$, where $\theta$ and n respectively represents azimuth of borehole around the hole axis in the range from 0 to 360 degree, and n (1,2,3 . . . N) is azimuth index at which the pulse-echo signal is acquired. The outer casing arrival time $TT_a$ is then determined 210 as peak time of moving-window energy ratio. The minimum (TT1) and maximum (TT2) outer casing arrival times are then determined 220, such as via Equations (1) and (2) set forth below.

$$TT1 = TT_a - \hat{D}_n - X_p \tag{1}$$

$$TT2 = TT_a - \hat{D}_n + X_p \tag{2}$$

where $\hat{D}_n$ is outer casing echo arrival time delay profile caused by the casing eccentricity, and azimuth-dependent back-propagation of the signals at the profile—$\hat{D}_n$ provide the maximum coherence.

The wave propagation velocity $V_p$ is then determined 214, such as via Equation (3) set forth below, where OD 239 and ID 238 are respectively the outer diameter of the tubular 160 and the inner diameter of the casing 120.

$$V_p = \frac{2*(ID - OD)}{(TT2 + TT1)} \tag{3}$$

The eccentricity ECC is then determined 216, such as via Equation (4) set forth below.

$$ECC = X_p \cdot V_p \tag{4}$$

Outer Casing Signal Excitation Mechanism and Model Signals

Figures 7, 8, 9:
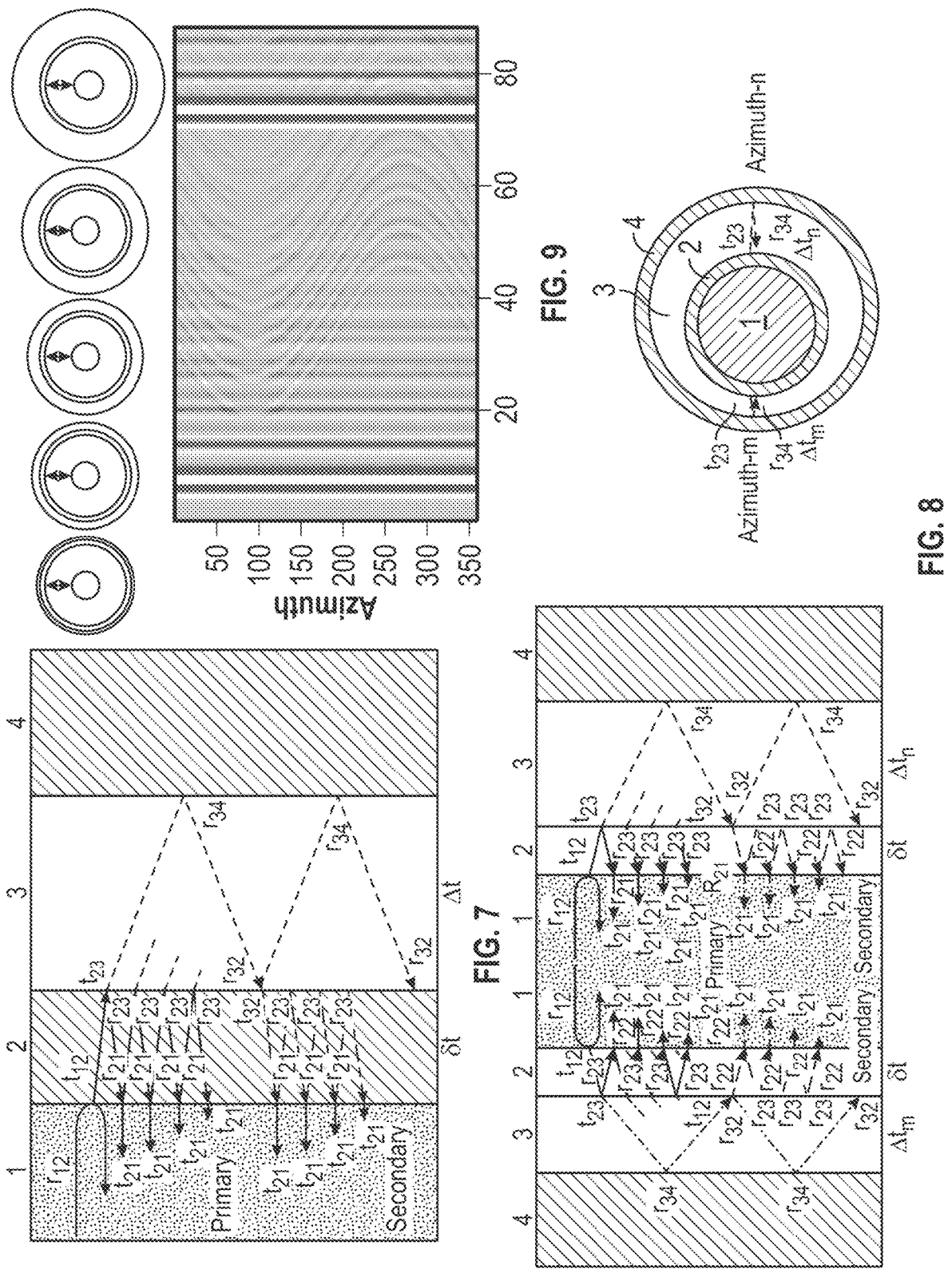
FIGS. 7 and 8 are schematic views of ultrasonic wave reflection and transmission responses in a dual-string cased hole.
FIG. 9 depicts an example set of model signals according to one or more aspects of the present disclosure.
Figures 10, 11, 12, 13:
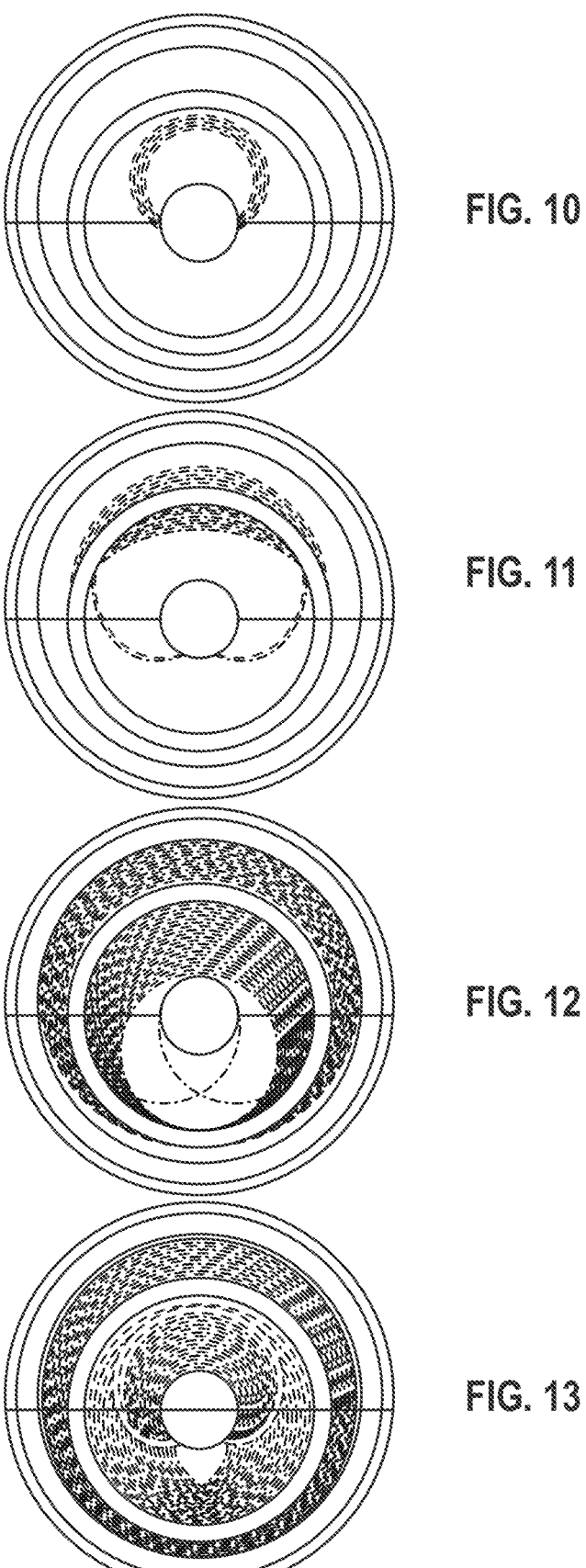
FIGS. 10-13 partially depict an example of forward modeling as time-lapsed acoustic pressure signal excitations in dual-strings.

When pulse-echo measurements are conducted in a dual-string cased hole in the inner tubular, one can observe outer casing echo in time-series, super-imposed on inner casing pulse-echo responses. FIG. 7 is a schematic illustration of ultrasonic wave reflection and transmission responses in a dual-string cased hole. In FIG. 7, the letters "r" and "t" respectively correspond to reflection and transmission. Two subscript numbers at the foot of "r" and "t" each indicate a material index at material boundaries. Materials 1, 2, 3, and 4 are respectively fluid (inside the inner tubular 160), steel (of the inner tubular 160), cement 116 (in A-annulus 162), and steel (of the outer casing 120), respectively shown in different colors of intermediate gray, dark gray, light gray, and dark gray. The gradation at the right and left edges indicates material continuities at the boundaries. Capital letters "R" and "T" identify acoustic signals excited as a result of reflection and transmission, and following numbers indicate the interface of two different materials that causes the reflection (R) and transmission (T) events.

When the ultrasonic transducer of the downhole tool emits an ultrasonic signal toward the fluid-filled inner tubular wall, the signal will be reflected at the fluid/steel boundary due to the presence of acoustic impedance contrast, at reflection coefficient represented as r12. A part of the signal is transmitted into the inner tubular casing (T23) and then reflected at the casing/cement interface (R23). The ultrasonic signal inside the inner tubular casing is repeatedly reflected back and forth (R21, R23), which is observed as a train of signals (T21) as the tubular thickness resonance. Multiple reflections (R) and transmission (T) events are illustrated with vertically offset proportional to its time-lapse for the sake of visualization, but the actual events along the radial directions happen at the angle of incidence, substantially close to the normal incidence to casing/fluid/cement interfaces. There will be reflection and transmission in both compressional (P-wave) and shear (S-wave) waves, but the P-component is dominating due to the normal incidence. The downhole tool uses these casing resonance signals (T21) to identify energy loss at the inner tubular/cement boundary, which can be inverted to acoustic impedance using, for example, the methods described in the U.S. Pat. Nos. 5,216,638 and/or 10,345,465, the entire disclosures of which are hereby incorporated herein by reference. Inner tubular thickness can be determined from the two-way reflection time δt inside the inner tubular, such as via the inverse of casing resonance frequency of returned signals T21 disclosed in U.S. Pat. No. 5,216,638.

The wave transmitted into cement (T23) will be reflected back and forth at cement/steel boundaries (2-3 and 3-2) and transmitted back to the inner tubular (T32). Outer casing reflection (R34) hits the inner tubular, and then excites the inner tubular resonance at the same frequency of inner tubular thickness resonance, although possibly at a different phase from the primary excitation T12, depending on the travel time Δt in the A-annulus. When the inner tubular 160 is eccentered relative to the outer casing 120, the travel time Δt in the A-annulus will have azimuthal dependency. The time delay from the inner tubular specular echo to the first outer casing arrival is two-way traveling time in the inner tubular (2×δt) plus two-way traveling time in the A-annulus (2×Δt). at the compressional velocity (Vp) of the annular material 164.

FIG. 8 is a schematic view of eccentered dual-strings relative to each other. The figure in the left presents the radius-axis cross-section view at eccentering orientation. The inner tubular is eccentered toward the left or azimuth-m. The shortest and largest travel time in the A-annulus is respectively at azimuth-m and azimuth-n, where azimuth-m is 180 degrees apart from azimuth-n.

When the tool is nearly centered in the inner tubular, signals from the outer casing will be maximized in their amplitude at the azimuth of eccentering orientation. When the inner tubular eccentering is relatively small, A-annulus travel time (Δt) will have a sinusoid profile, having the minimum and maximum at the respective azimuth indices, m and n. When the eccentricity increases, azimuthal profile may deviate from sinusoid, dilatated and compressed respectively toward azimuth-m and n. Prediction of azimuthal profile of Δt is possible using ray-tracing technique, or more precisely using forward modeling, such as finite difference, finite element, spectral element, semi-analytical modeling, or modeling software combining such techniques.

FIG. 9 depicts an example set of model signals while rotating the firing directions in the dual-strings in eccentered conditions, using semi-analytical modeling (e.g., according to one or more aspects described in "Analytical modeling for fast simulations of ultrasonic measurements on fluid-loaded layered elastic structures," S. Zeroug, IEEE Transactions on Ultrasonics, Ferroelectrics, and Frequency Control, vol. 47, no. 3, pp. 565-574, May 2000, doi: 10.1109/58.842043). Simulated signals in one turn is presented in variable density log (VDL) like image. The vertical and horizontal axes are respectively azimuth (unit in degree) and time step. Vertical light/dark stripes show the inner tubular resonance that decays as a function of time, radiating the acoustic energy out of the casing. Light/dark sinusoidal patterns superimposed onto the vertical lines are the outer casing echo that excited the inner tubular resonance. The example simulation was not in exact dual-string geometry, instead using simplified geometry. Time variation of echo signals are simulated varying the inner radius of the external casing, mimicking the distance variation caused by eccentering. Precise model data can be simulated using finite element modeling, An example of forward modeling of COMSOL, is partially depicted in FIGS. 10-13 as time-lapsed acoustic pressure signal excitations in dual-strings. One pressure source excites ultrasonic signal toward the top side of the inner tubular that is eccentered toward the bottom side of the image. From simulated time-domain signals in 2-D plane, one can generate synthetic pulse-echo signals that is identical to the measurements. Repeating such simulations over multiple different azimuths referring to the eccentering direction, one can generate a set of waveforms simulating the actual pulse-echo signals acquired by the tool in dual-strings in eccentered conditions.

Tool Measurements in Dual-String Well

Figure 14A:
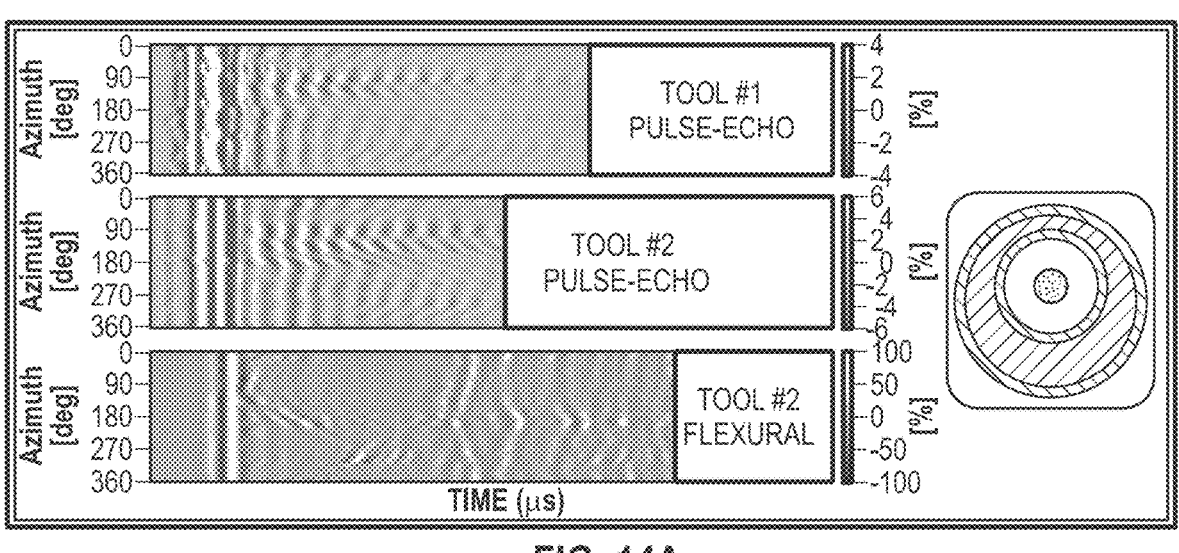
FIGS. 14A-B and 15A-C depict example VDL images showing ultrasonic signals acquired in a dual-string test well.

In the actual tool measured signals, inner casing echo and casing resonances tend to appear as nearly vertical lines, while outer casing echo from its inner radius will present sinusoidal arrival time dependency when two tubulars are eccentered with respect to each other. FIG. 14a depicts example VDL images showing ultrasonic signals acquired in a dual-string test well, using two different tools of Tool #1 and Tool #2, that were respectively equipped with an ultrasonic phased array transducer and the conventional pulse-echo transducer. The three VDL images from the top to bottom respectively present Tool #1 phased array pulse-echo, Tool #2 pulse-echo (PE), and Tool #2 flexural pitch-catch (PC) measurements. In each image, the horizontal and vertical axes are respectively waveform time (unit: μs) and sensor azimuth or rotation in a tubular from κ to 360 degrees. The strongest signals in high contrast (light and dark stripes) near the time of 10 μs are the specular echo or direct reflections at the fluid/steel boundary in the inner tubular for the pulse-echo images, and inner tubular flexural waves in the flexural image. The outer casing arrivals at the earliest and latest times can be seen near the times of about 16 and 36 μs in the pulse-echo images, and at about 20 and 72 μs in the flexural image, respectively at the azimuth of about 90 and 270 degrees. The signals were acquired in a water-filled inner tubing that was cemented in an outer-casing at the controlled eccentricity of a test well. Cement is in A-annulus.

Figure 14B:
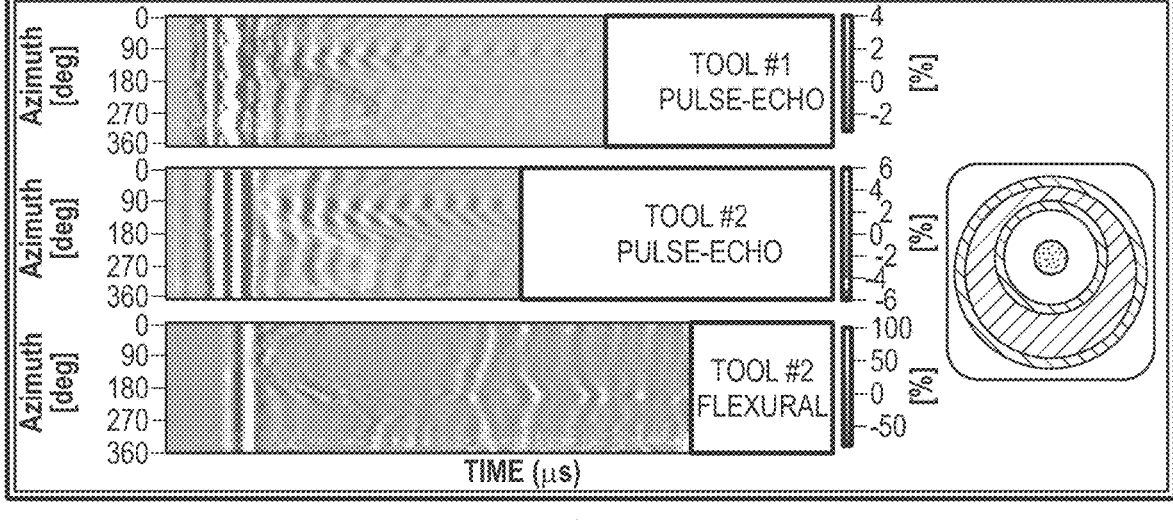

FIG. 14b depicts the images of FIG. 14a with dashed lines indicating outer casing echo signals. The horizontal axis of the flexural VDL is adjusted in the way that sinusoidal echo shapes well matched to that of pulse-echo signals. One or more aspects introduced in the present disclosure may be utilized to automatically estimate the inner tubular eccentering direction and its magnitude, even when the flexural measurement is not available.

Figures 15A, 15B, 15C:
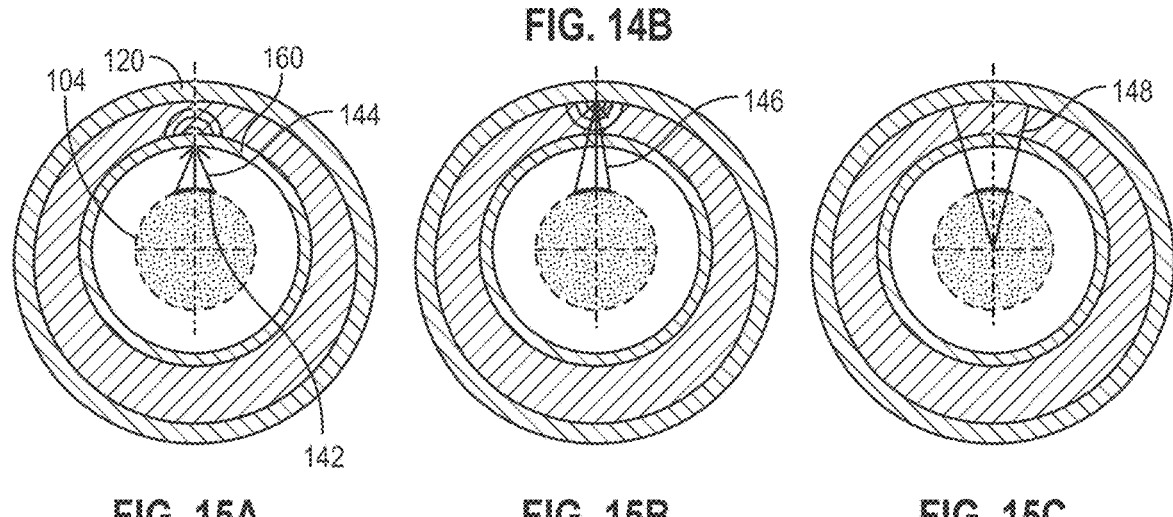

Another aspect of this invention is to use an ultrasonic phased array 139 different focusing to enhance the outer casing signals. FIGS. 15a, 15b and 15c illustrates the tool 104 virtually centered in the inner tubular. In downhole, the phased array module 139 may be eccentered in inclined wells, however, the phased array tool 139 can estimate and recover ultrasonic beam pattern as disclosed in U.S. Pat. Pub. 2021/0247538 and/or U.S. Pat. Pub. 2021/0311224. FIG. 15a presents a part of phased array 142 is emitting acoustic pulses 144 focused at the inner surface of the inner tubular 160. Focused beam will minimize the inner tubular ringing and transmit signals in A-annulus in spherical waves, and echo from the outer casing 120 inner surface can be easy to be enhanced. FIG. 15b illustrates the phased array beam 146 focused at the inner surface of the outer casing 120. FIG. 15c illustrates the ultrasonic beam 148 excited from the group of phased array elements 142 nearly at normal incidence to the outer casing surface. Inner tubular 160 resonance will be energetically excited and reflected signals from the outer casing 120 will be naturally in-phase when reflected back to the group of the elements 142. The best beam pattern to identify casing eccentricity and wave propagation speed of annular material, will be dependent on annular material and geometrical parameters of the tool/inner tubular/outer casing, but the phased array tool 139 is capable of controlling the beam patterns in desired manner, either or both for signal emission and reception.

Discretely time-sampled pulse-echo signals of inner tubular echo signals of ring-down part can be approximated utilizing Equations (5)-(7) set forth below.

$$s'_{nm}(t_k) = e^{-\dot\omega_n \cdot (\delta t_n + dT_n)} \cdot \left[ A'_n e^{-i\omega_n t_k} + B'_n e^{-i\omega_{nm}(t_k + \Delta t_{nm})} \right] \quad (5)$$

$$\omega_n = \dot\omega_n - i\ddot\omega_n \quad (6)$$

$$\omega_{nm} = \dot\omega_{nm} - i\ddot\omega_{nm} \quad (7)$$

The parameter $s'_{nm}$ is the pulse-echo signal at observation azimuth or transducer azimuth index n toward outer casing surface reflection point or area index m, $t_k$ is the $k^{th}$ time step, and $A_1$ and $B_{nm}$ are respectively signal amplitude of primary inner tubular excitation at observation azimuth n. Three time parameters $dT_n$, $\delta t_n$ and $\Delta t_{nm}$ are respectively two-way travel time of acoustic signals (e.g., compressional wave) in the effective distance between (1) transducer-inner surface of inner tubular, (2) thickness of inner tubular at observation point n, and (3) thickness of A-annular spacing, at observation azimuth index n and outer casing reflection point or area index m. The parameters $\omega_n$ and $\omega_{nm}$ are effective inner tubular casing resonance angular frequency at observation point n and outer casing reflection point or area index m. The parameters $\omega_n$ and $\omega_{nm}$ are complex values including attenuation, and their values are substantially close but may be marginally different. The symbol i is the imaginary unit number.

In the complex angular frequency, $\omega$ with single-dot ($\dot\omega_n$) and double-dot ($\ddot\omega_n$) accents respectively indicate real and imaginary parts. The imaginary part represents attenuation of inner tubular resonance caused by the acoustic energy radiation into surrounding materials. The first term of $s_{nm}$ shows phase delay caused by two-way travel time delay, $\delta t_n$ in inner tubular thickness and $dT_n$ in the space between transducer and the inner surface of the inner tubular. $dT_n$ can be canceled by aligning pulse-echo signals in the time-domain, applying delay estimated from the specular echo envelope peak time.

Pre-Processing—Pulse-Echo Signal Alignment and Normalization

Raw signals may be acquired by the tool that can be eccentered in the inner tubular, which introduces unwanted time delay and amplitude modulation to the signals. Such tool eccentering effect may be removed prior to applying dual-string eccentricity estimation. Raw data may also contain unwanted casing modes, such as higher-order Lamb mode or the $3^{rd}$ harmonics of casing thickness mode, or acquisition-system dependent noise. Signals may be filtered applying a digital filter, for example, a finite impulse response filter. Amplitude normalization may be optional.

Figures 16, 17:
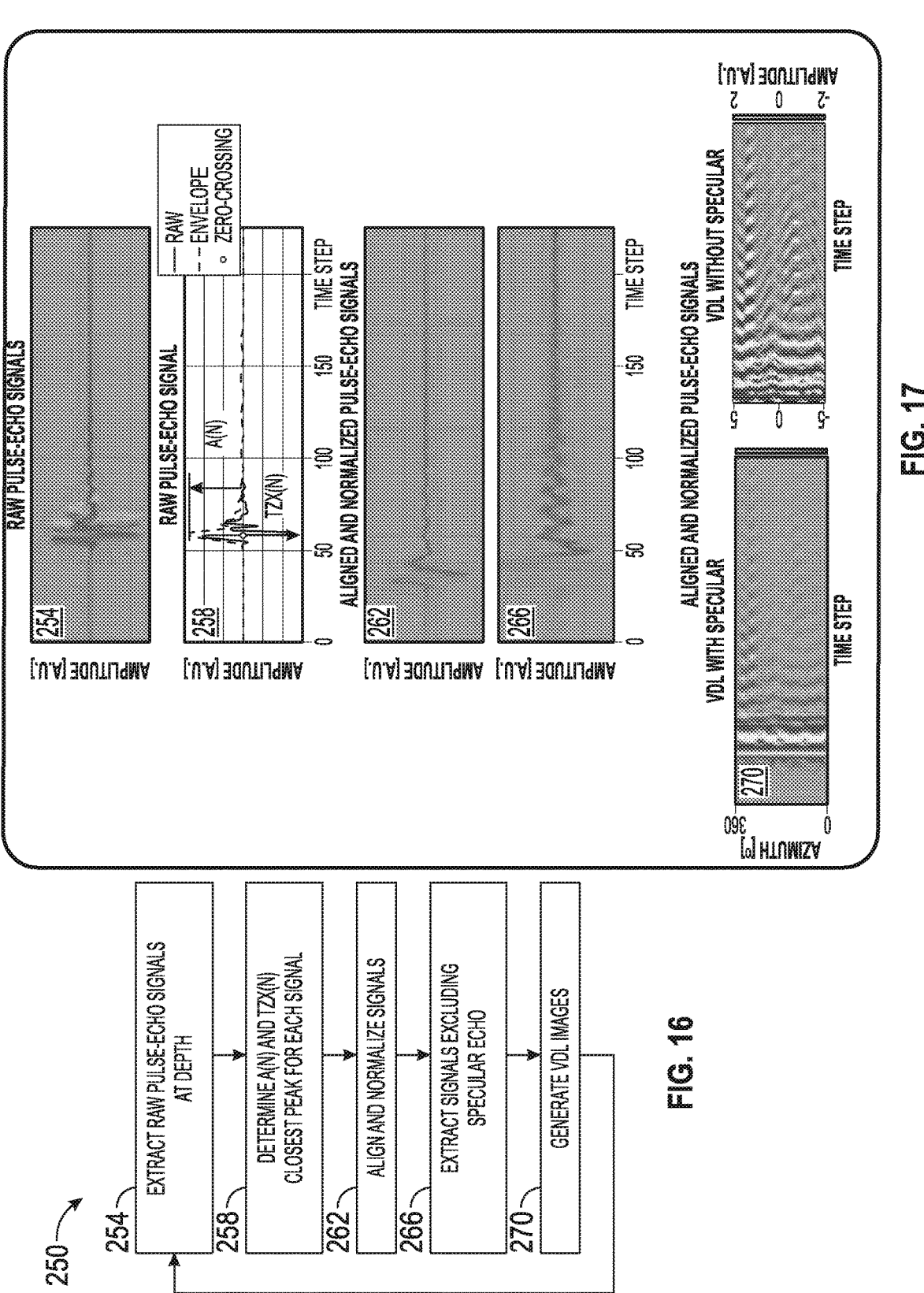
FIG. 16 is a flow-chart diagram of at least a portion of an example implementation of a method according to one or more aspects of the present disclosure.
FIG. 17 is a graphic diagram accompanying FIG. 16.

FIG. 16 is a flow-chart diagram of at least a portion of an example implementation of a method 250 of pulse-echo signal pre-processing and/or data preparation for dual-string eccentricity estimation according to one or more aspects of the present disclosure. FIG. 17 includes several graphics depicting example aspects of the procedures performed during the method 250, each graphic being numbered with a corresponding procedure.

The method 250 includes extracting 254 raw pulse-echo signals (total: N time-traces) at one wellbore depth. Band-pass filtering may be applied to remove higher-order casing mode or harmonics of thickness mode. The method 250 then proceeds to find 258 the envelope peak amplitude A(n), as well as the closest zero-crossing tzx(n) to the peak, for each signal. The signals may then be aligned and normalized 262. Aligning may comprise applying a time shift, such as tzx(n)-median(tzx). The signals may be normalized by the respective envelope amplitude A(n). Signals excluding the specular echo may then be extracted 266. VDL images of the aligned and normalized signals, with and without specular echo, may then be generated 270. The method 250 is then repeated at each depth of the logged interval in the well.

When specular echo arrival time at the azimuthal observation point is estimated as TTn, compensation move-out $cT_n$ may be determined utilizing Equation (8) set forth below.

$$cT_n = \text{median}(TT_n) - TT_n \quad (8)$$

The amplitude of pulse-echo signals may be substantially close but can be different. In such cases, variation may be compensated by applying normalization gain $g_n$), using observed specular echo amplitude $E_n$, such as set forth below in Equation (9).

$$g_n = \text{median}(E_n)/E_n \quad (9)$$

The aligned and normalized signal (asnm) may be determined utilizing Equation (10) set forth below.

$$s'_{nm}(t_k) = e^{-i\omega_n \cdot (\delta t_n + dT_n - cT_n)} \cdot \left[ g_n A'_n e^{-i\omega_n t_k} + g_n B'_n e^{-i\omega_{nm}(t_k + \Delta t_{nm})} \right] \quad (10)$$

Replacing $g_n A'_n$ and $g_n B'_{nm}$ by $A_n$ and $B_{nm}$, respectively, and considering the azimuthal variation of $\delta t_n$ and $dT_n$-$cT_n$ are substantially close to zero, the aligned and normalized signal (snm) may be determined utilizing Equation (11) set forth below. $B_{nm}$ may include integral of Dirac delta function, dirac($t_k$-$\Delta t_{nm}$), which makes the value 0/1 before/after $t_k = \Delta t_{nm}$.

$$s_{nm}(t_k) = A_n e^{-i\omega_n t_k} + B_{nm} e^{-i\omega_{nm}(t_k + \Delta t_{nm})} \quad (11)$$

To estimate the eccentricity of dual-string, one can apply eccentering correction move out, of which value changes as a function of azimuthal observation point.

A: Pre-Processing—Inner Tubular Ring-Down Reduction/Optional

In case the A-annulus is fluid-filled, inner tubular thickness ringing signals from the primary excitation will be energetically excited and can last for a relatively long time with small attenuation. Unlike solid that has relatively high acoustic impedance (e.g., class-G cement from κ to 7 MRayl versus water of which acoustic impedance is around 1.5 MRayl), reverberating acoustic energy in the inner tubular (of which acoustic impedance is around 46 MRayl) will not be dissipated due to relatively low acoustic coupling between steel and fluid. As a result, outer casing signals may appear to be relatively weak. Ratio of inner tubular ringing, of outer casing echo to the primary excitation can be estimated using transmission and reflection coefficient ratio, which is proportional to t23*r34*t32/r23, which is 4*Z2*Z3/(Z2+Z3)^2*(Z4−Z3)/(Z4+Z3)/[(Z2−Z3)/(Z2+Z3)]. Z2, Z3, and Z4 are respective acoustic impedances of the inner tubular, the A-annulus material, and the outer casing. Outer casing signal strength ratio of water-filled A-annulus to class-G cement filled A-annulus can be approximately 0.27. Signal coherence computation results may be affected by the presence of relatively large signals of the primary excitation as "noise", and reduction or removal of the primary ringing may improve eccentering estimation.

Figures 18, 19, 20, 21:
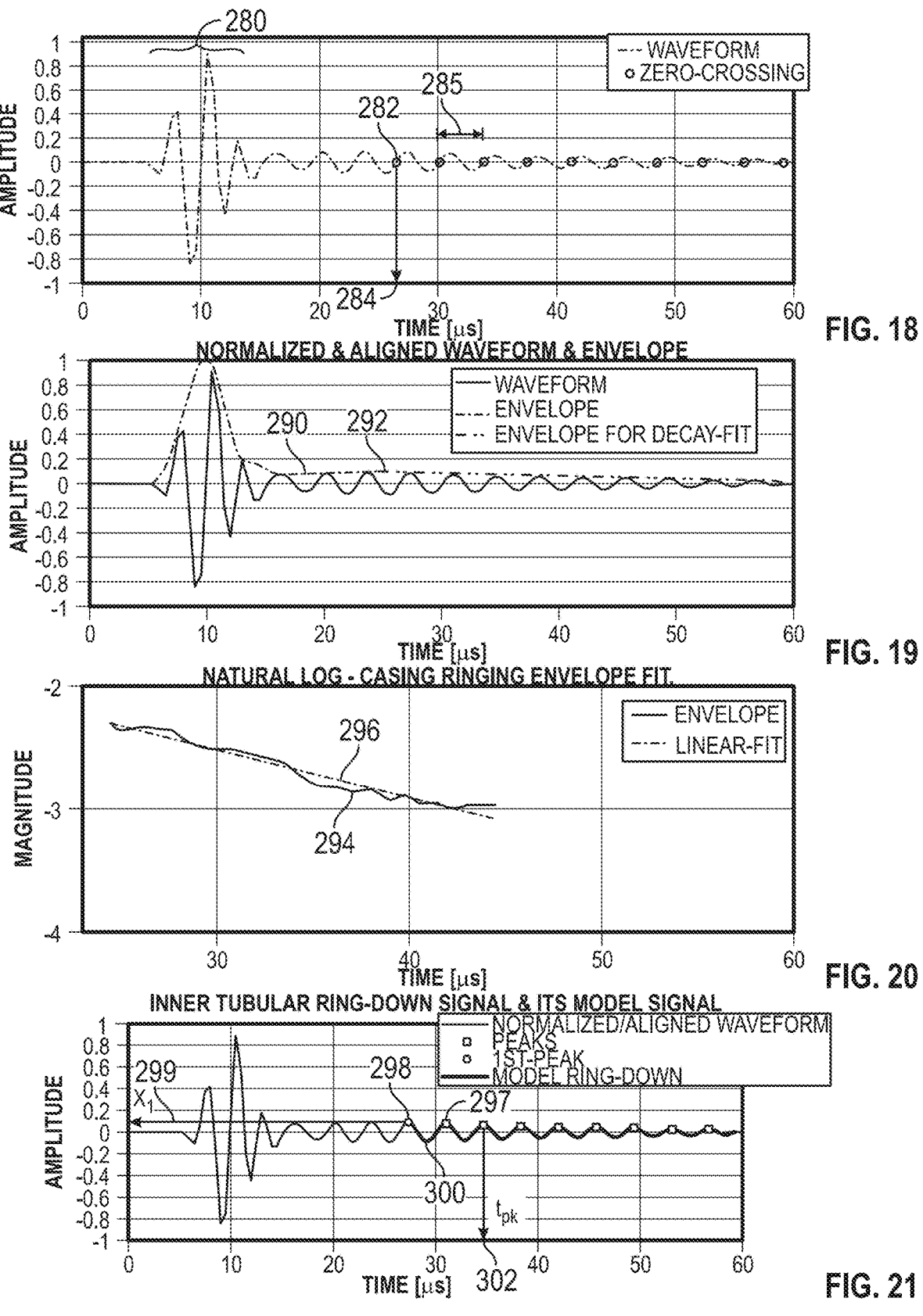

FIG. 18 depicts example pulse-echo signals acquired in dual-strings at one azimuth, wherein the dominant signal is the casing resonance excited by the primary incidence of ultrasonic signal following the specular echo 280. Signals are already aligned with each other referring to the median of the zero-crossing closest to the envelope peak. Zero-crossing 282 time of the signals (tzx) 284 are extracted over J cycles, from about 17 μs after the dominant specular echo zero-crossing time at approximately 10 μs in this example waveform. J is user parameter that is larger than 1. One period 285 of zero-crossing is substantially close to the inverse of the inner tubular casing resonance frequency. Taking the average of the period in Mcycles, one can estimate casing resonance, $f_{RES}$ reliably. The averaging method can be simple arithmetic, median, or any other statistical method including outlier rejection in computation. This example time-domain processing does not limit applying alternative frequency determination in the frequency-domain processing applying Fast Fourier Transformation FFT) to the time-domain signals, such as according to one or more aspects described in the method disclosed in the prior art of U.S. Pat. No. 5,216,638. The time-domain zero-crossing time picking method is preferred in this invention due to its capability of identifying time-intervals in which phase or/and frequency changes caused by signals other than inner tubular resonance at fine time resolution relative to the FFT method. Such noise presence is more sensitively detected using signal peak amplitude time 298 detection shown in FIG. 21, that is alternative to zero-crossing method.

From J-cycle of zero-crossing time 284 tzx(j)[j=1, 2, 3, . . . , J] of the signal at the observation azimuth n, resonance frequency, $f_{RES}(n)$ can be determined utilizing, for example, Equation (12) set forth below.

$$f_{RES}(n) = \frac{1}{J-1} \sum_{j=1}^{j=J-1} \frac{1}{(tzx(j+1) - tzx(j))} \qquad (12)$$

FIGS. 19 and 20 present the example echo signal envelope, respectively as a dash two dotted 292 and solid 294 curve. The envelope after 25 μs 292, which is presented in a dash-two-dot line, shows amplitude reduction caused acoustic energy radiation into materials surrounding the inner tubular. The attenuation rate of inner tubular resonance can be determined utilizing the entire or time-windowed envelope data. FIG. 20 shows the logarithmic value of the envelope 294, in the time-window of [25, 43] μs. The dashed line 296 represents linear fitting of the logarithmic curve 294, having a slope proportional to the attenuation rate of casing ringing. Start/end time of the window are a part of processing parameters that could be varied depending on well geometries and materials.

Inner tubular resonance decay rate can be determined by linear regression 296 of the envelope in logarithmic value 294. The curve presented in FIG. 19 is an example signal envelope 290 in linear vertical scale.

Alternatively, or additionally, inner tubular resonance or ring-down attenuation can be determined from the ratio of neighboring peak amplitudes, such as are presented by hollow circles 297 in FIG. 21. After computing their peak amplitude values, $x_m$ 299 from 1 to M in precision, for example, applying interpolation, averaged attenuation can be determined from their averaged ratio, using an example Equation (13) set forth below.

$$att = \frac{1}{M-1} \sum_{m=1}^{m=M} \ln\left(\frac{x_m}{x_{m-1}}\right) [\text{unit: } neper] \qquad (13)$$

Equation (13) is an example, which does not prevent using alternative computation methods, such as simple average after removing outliers, median average, or median of central N attenuation (N<M), or other statistical estimation methods. The determined attenuation can be used as set forth below in Equation (14) that determines imaginary part of angular velocity of the casing resonance. M is a part of user parameters that will be varied depending on well parameters, including casing diameter and material properties.

$$\ddot{\omega}_{model} = f_{RES} \cdot att \qquad (14)$$

FIG. 21 shows the example peak amplitude 297 of signal in the time-window of interest in hollow circles, first peak amplitude 298 in a solid circle, and estimated casing ring-down 300 in a solid bold line, that is computed as the first term of Equation (11), such as set forth below in Equation (15).

$$s_{model}(t_k) = A_n e^{-i\omega_n t_k} \qquad (15)$$

Peak time 302 (tpk) can alternatively be used to determine averaged inner tubular resonance frequency, such as set forth below in Equation (16).

$$f_{RES\_pk}(n) = \frac{1}{M-1} \sum_{j=1}^{j=M-1} \frac{1}{(tpk(j+1) - tpk(j))} \qquad (16)$$

After obtaining the attenuation rate, the inner tubular ring-down signal can be estimated, starting from arbitrary time, knowing its amplitude and phase at the starting time. One of the example start time can be the 1st peak 298 in FIG. 21, at which the amplitude is xi 299 and phase angle is 0.

FIG. 22 presents estimated inner tubular ring-down signal 304 and initial excitation 305, respectively in a solid and dash-dot line curve. The dash-dot curve 305 is the original ringing waveform depicted in FIG. 18. The estimated ring-down signal 304 is subtracted from the original signal 305. Residual 306, the initial signal 305 minus the ring-down signal 304, is presented as a curve in dashed line.

FIG. 23 presents another estimated inner tubular ring-down signal 309, initial excitation 308 and residual 310 at different azimuthal observation point where outer-casing signal is larger and visible in VDL image of FIG. 24. The difference between the dash-dot 308 and solid line 309 is presented as a curve in dashed line 310, of which amplitude is relatively large in the time interval between 42 and 60 μs. FIGS. 24 and 25 are VDL images of inner tubular pulse-echo signals, before (FIG. 24) and after (FIG. 25) estimated inner tubular ring-down removal, and they are presented in the same color scale. Inner tubular initial ring down 312 is dominating the outer casing arrivals 314 in the VDL of FIG. 24, while the outer casing echo 316 signals became more visible 316 relative to the initial inner tubular ring-down, after its model signal 304, 309 removal, as shown in the VDL of FIG. 25.

One example model casing resonance signal at azimuth n, $s_{n,model}$, excited by the primary specular, can be determined utilizing Equation (17) set forth below.

$$s_{n,model}(t_k) = x1_n \cdot e^{-i\omega_n(tk - t_{pk}(1)_n)} \qquad (17)$$

The model casing resonance signal can be reliably utilized to remove the primary excitation ring-down of the original inner tubular signal in the interested time interval, after the first peak time. The residual signal after subtracting the model signal, sr, can be determined utilizing Equation (18) set forth below.

$$sr_n(t_k) = s_{nm}(t_k) - s_{n,model}(t_k) \qquad (18)$$

This single-waveform based inner tubular resonance estimation and removal is one example, and does not prevent applying alternative stochastic processing, such as "bin processing", according to one or more aspects described in U.S. Pat. No. 5,859,811, the entirety of which is hereby incorporated herein by reference.

Pre-processed signal, $spp_n$, at azimuth n, after reducing the primarily excited inner tubular resonance is equal to $sr_n(t_k)$. Further removal of azimuthally common arrivals, can be achieved as an option, by subtracting azimuthal median of sub-grouped residual signals, such as set forth below in Equation (19). Sub-group can be selected at azimuth between n+L and n−L, where L is the user parameter that can be equal or greater than 1.

$$spp_n(t_k) = sr_n(t_k) - \underset{n-L}{\overset{n+L}{\text{median}}} (sr_n(t_k)) \qquad (19)$$

Depending on the amplitude of primary resonance excitation and its attenuation rate in aligned/normalized signals, raw aligned and normalized signals ($s_{n,model}(t_k)$) or outer casing arrival enhance signals, $spp_n(t_k)$, can be used as input signals to outer casing coherence computation described below in "Dual-string Eccentricity Parameter—Core Processing Chain."

The method presented above is one example, and alternative methods may be utilized, such as subtracting the azimuthal median waveforms of the entire waveforms acquired during 1-turn, or applying statistical ringing estimation using a gather of waveforms acquired at similar well parameters (e.g., similar casing thickness, similar tool centralization in the inner tubular, etc.), such as according to one or more aspects described in U.S. Pat. No. 5,859,811.

Dual-String Eccentricity Parameter Estimation—Core Processing Chain

The core part of dual-string eccentricity estimation is described in this section. Eccentricity determination of the inner tubular consists of two parts, (1) applying parameterized model beam forming or move-out to the signals to compensate outer casing arrival delays introduced by inner tubular eccentricity inside the outer casing, and (2) determining coherence of beam-formed signals. One example coherence computation method is the slowness-time coherence determination that is utilized for formation slowness inversion using array sonic signals, such as according to one or more aspects described in U.S. Pat. No. 4,594,691, the entirety of which is hereby incorporated herein by reference. The difference from the formation slowness computation is that wave form move-out is not determined linearly proportional to receiver spacing and formation slowness but undulated among the azimuthal signals as a function of dual-string 160, 120 geometries, the tubular eccentricity and wave propagation speed of the material in A-annular space 164. Eccentering of the dual string is represented by two independent parameters, e.g., azimuthal direction $\varphi_q$ with azimuthal index q, and $X_p$ that is the average of the maximum and minimum delay values, and then, the eccentricity is a product of Xp and the wave propagation speed of the material in A-annulus 164. Because casing eccentering direction and its magnitude are unknown, they will be numerically varied in a predetermined range. Azimuth range is from one to the maximum azimuthal shots number, N. The maximum delay value is in the range from zero to Tmax, where Tmax is equal to the distance between the outer diameter of the inner tubular and the inner diameter of the outer casing, divided by the wave propagation speed of the material in A-annulus. If the A-annulus is cemented, one can use typical compressional or P-wave velocity of well cement that is measured by cementing company, or a nominal value available in a publicly available database, or acoustic impedance of measured acoustic impedance of cement divided by slurry density. If the A-annulus is filled by production fluid, one can approximate wave propagation speed as the square root of the bulk modulus divided by fluid density, which may be available as PVT data of the production fluid. For example, for an inner tubular OD of 4.5 inches and outer casing ID of 8.535 inches, maximum eccentricity is equal to half of the OD-ID value, which is 2.015 inches (in) or 51.2E-3 meters (m). When the A-annulus is filled by water that has a wave propagation speed of 1500 meters/second (m/s), the maximum move-out value is 51.2E-3 m divided by 1500 m/s, which is 34.2 μs.

Outer casing arrival time delay caused by the casing eccentricity can be approximated as azimuthally modulated sinusoid from models, for examples, ray-tracing technique, or numerical forward modeling. Example forward modeling may be finite difference software, finite element software (COMSOL, OnScale, etc.), spectral element and semi-analytical software (e.g., CIVA/CEA-List), or the hybrid method that is described in "Study of complex ultrasonic NDT cases using hybrid simulation method and experimental validations," Mahaut, S., Leymarie, N., Poidevin, C., Fouquet, T., Dupond, O., Insight 2011, 53, 664-667. In the present disclosure, sinusoidal delay is used to demonstrate an example, which does not limit using different beam-forming profiles that could be different from sinusoid.

FIG. 26 depicts an example eccentering estimation data flow, searching two move-out parameters, $X_p$ and $\varphi_q$, that maximize coherence, according to one or more aspects of the present disclosure. Azimuth dependent move out is denoted as $D_n$, where the suffix n is azimuthal observation point index. $D_n$ is in a vector data of move-out values having the same length as signal observation points. $D_n$ can be provided alternatively in a polynomial form, which could be ray-tracing based analytical formula, or could be from a look-up table of a numerical simulation database. A sinusoidal move-out 320 is used as one of the examples for the sake of demonstrating this invention, as set forth below in Equation (20).

$$D_n(p, q, \theta_n) = X_p \cdot \cos(\theta_n - \varphi_q) \qquad (20)$$

The parameters $X_p$ and $\varphi_q$ are respectively maximum move-out time and angle of eccentricity. The parameter $\theta_n$ is azimuthal angle of observation point on the tool relative to the tool reference orientation 141, which could be mechanical rotational angle of a transducer or central element angular position of a subset elements 142 of an ultrasonic phased array tool 139. Another move out example is a combination of two sinusoids including harmonics, such as set forth below in Equation (21).

$$D_n(p, q, \theta_n) = X_{p1} \cdot \cos(\theta_n - \varphi_q) + X_{p2} \cdot \cos(2(\theta_n - \varphi_q)) \qquad (21)$$

In this example, peak delay time Xp 322 is represented by the sum of $X_{p1}$ and $X_{p2}$, and the profile Dn shows outer casing arrival delay distortion from a simple sinusoid of the Equation (21).

In FIG. 26, two set of waveforms, one 330 before and another one 335 after applying one example move-out Dn 332 are illustrated. Horizontal arrows 332 indicate azimuth-dependent different move out values in negative (left) and positive (right). There are multiple ways of computing coherence(coh) of the pulse-echo signals of $y_n$ after applying move-out $D_1$. One example is set forth below in Equation (22).

$$coh(k, kwin, p, q) = \frac{\sum_k^{kwin}\left[\sum_n^N y_n(t_k + D_n)\right]^2}{\sum_k^{kwin} \sum_n^N y_n(t_k + D_n)^2} \qquad (22)$$

Two terms in the numerator and denominator of Equation (22) are respectively representing the energy of summed waveforms over the entire N azimuths and the sum of individual waveform energy in the time window length specified by the kwin.

The parameters k and k+kwin are respectively indices of starting time 334 and ending time 336 of the window in which the coherence is to be computed. This window can be set in a time window 319 presented in FIG. 25 for an example, where the outer casing arrivals 316 are present at relatively high signal 316-to-noise 318 ratio, after applying move-out 332. For one set of parameters [k, kwin], two-dimensional coherence values are derived for different values of $X_p$ (or simply expressed as "p") and $\varphi_q$ (or simply expressed as "q"). The waveform $y_n$ can be one of pulse-echo signals, for example $s_{nm}$ or $sr_n$ or $spp_n$, that are presented in formula from 17 to 19.

Varying $X_p$ value as a multiple of sampling time in the range from 0 to P, and angle of eccentricity in the range from $\theta_1$ to $\theta_N$, for an example, one can obtain coherence in the p-q plane 338. Eccentering can be estimated as the parameter set of p-q that maximizes coherence of move-out signals. One can search the maximum coherence value along the horizontal axis p, as the maximum coherence curve 340 as a function of azimuth, then search the peak value of the curve 340. Peak azimuth angle $\varphi_q$ 342 can be refined applying quadratic interpolation to measured values of the three azimuths indices of q−1, q1 and q1+1.

Residual inner tubular resonance 318 lowers the coherence of the outer casing signals, and the coherence from one set of [k, kwin] parameters provides multiple peaks 344 as aliasing depending on the nature of the outer casing signals. Such aliased peaks could be picked as false eccentricity parameters in the p-q plane. For reliable eccentricity parameter determination, one method is to average coherence data in p-q plane from multiple [k, kwin] parameters. Statistical method can be arithmetic average, median of coherence data at respective p-q parameter, or average of coherence data excluding anomalies (e.g., statistical outlier rejection exceeding m-times of the standard deviation, m can be a user parameter). The arithmetic averaging method is presented as an example, in Equation (23) set forth below.

$$coh_{ave}(kwin, p, q) = \frac{1}{K}\sum_k^{k=K} coh(k, kwin, p, q) \qquad (23)$$

From refined coherence data after averaging, eccentricity value is computed reliably from one set of $[X_p, \varphi_q]$ parameters. Coherence peak will appear when $X_p$ matches the casing arrival time delay caused by eccentering, at the direction $\varphi_q$.

Figures 28, 29:
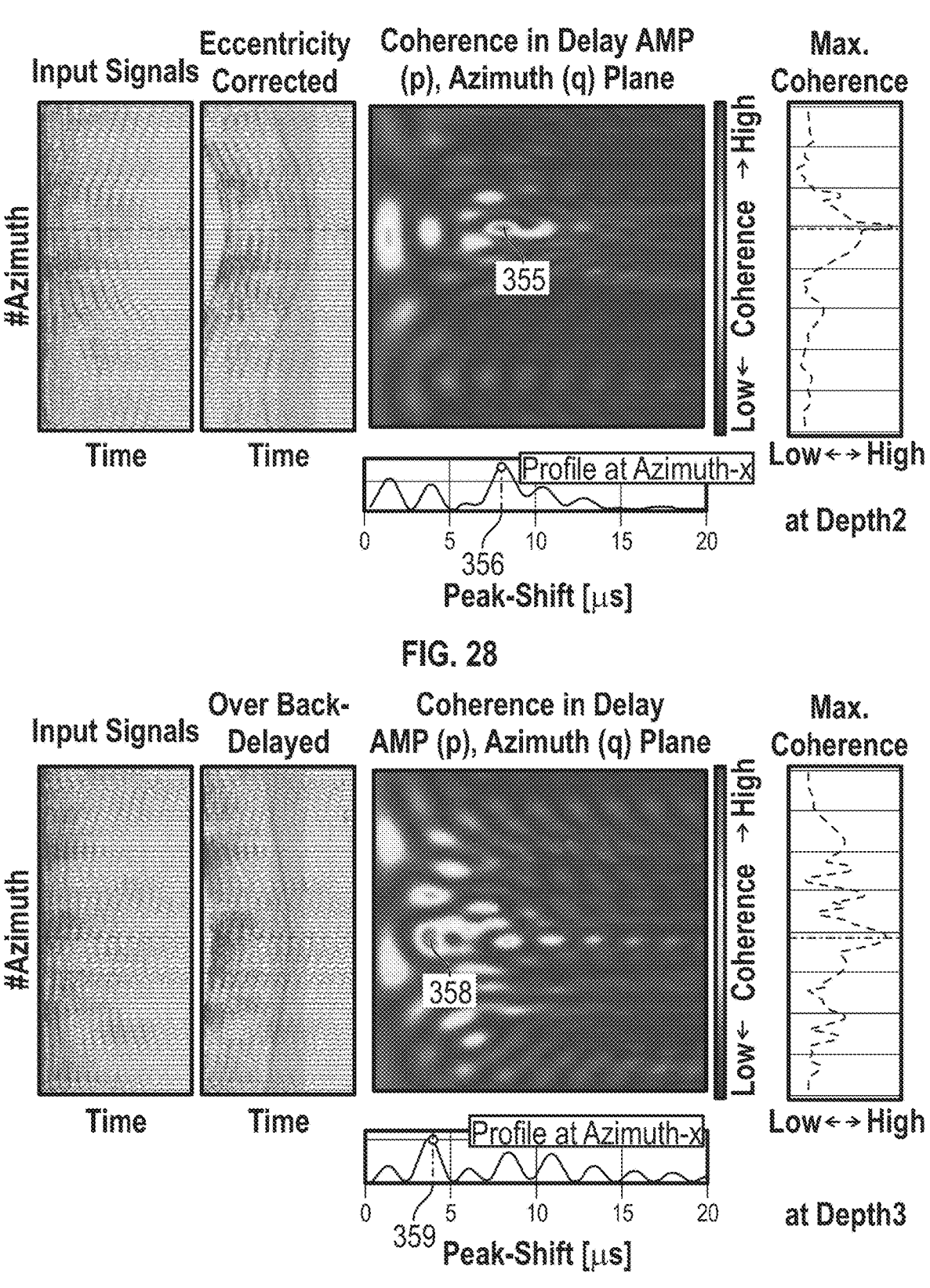

FIGS. 27-29 demonstrate coherence determination in the p-q plane using three different depths of a well having casing different eccentricities of 69%, 63%, and 43%, respectively. Peak search on the 2-D coherence plane provided the parameter set that provides the maximum coherence peaks 352, 355, 358 in the move-out or shift axis, in the way that Xp value reducing from the right to left 353. Peak position at different angle $\varphi_q$ is mainly due to tool 104 rotation. $X_p$ values can be translated to eccentricity value in distance, applying the wave propagation velocity in the cement using most probable values obtained from the cementing company database, nominal velocity of the type of cement, or based on impedance measurements toward the opposite side of the casing eccentering where acoustic impedance measurement may be most reliable. For example, using compressional velocity $V_p$, eccentricity ECC can be determined as a product of $X_p$ and $V_p$, as set forth below in Equation (24).

$$ECC = X_p \cdot V_p \qquad (24)$$

FIG. 27 presents an example eccentering estimation result of dual-strings eccentricity at 69%. Coherence peak was found at [$X_p$ 354 $\varphi_q$ 342]. The first 330 and second 334 columns show aligned and normalized waveforms before (1st column 330) and after (2nd column 334) applying parameterized move-outs and resulting coherence in the p-q plane. The top 338 and bottom 350 graphs in the 3rd column shows coherence in p-q plane, and its slice at the maximum coherence azimuth 342. The graph in the $4^{th}$ column 340 shows the maximum coherence values projected to the azimuth axis, p. Coherence computation time window is between kn 335 and kn+kwin 336, that is indicated by a middle-grey-mask 337 on the $2^{nd}$ column graph 334. The maximum move-out or delay time Xp is varying from 0 to 20 µs, as it is indicated in the horizontal axis of the bottom graph 350 in the $3^{rd}$ column. The coherence peak is found at one point 352 in the p-q plane, and corresponding move-out profile Dn is presented in a gray line 320 in the $2^{nd}$ column graph 334. Eccentering direction, $\varphi_q$ is found at one azimuth 332 in the $4^{th}$ column graph 340.

FIG. 28 presents the example eccentering estimation result of dual-strings eccentricity at 63%. Coherence peak was found at $[X_p, \varphi_q]$ 355 in the p-q plane in the top graph of the $3^{rd}$ column. FIG. 29 presents the example eccentering estimation result of dual-strings eccentricity at 43%. Coherence peak was found at $[X_p, \varphi_g]$ 358 in the p-q plane in the top graph in the $3^{rd}$ column. The three values of Xp 354, 356, 359 reduced proportionally to the eccentricity indicator values of 69, 63 and 43% in these example results.

This processing method is applicable even for the case when the outer casing arrivals from the opposite side of eccentering direction are missing. In the ultrasonic data acquisition for cement evaluation, acquisition could be performed in a way that received signals do not contain the outer casing arrivals for pulse-echo measurements targeting annular impedance evaluation. The outer casing arrivals in such measurements are unwanted noise, therefore, it is often observed that the outer casing TIE is not present at azimuths in the far side of casing eccentering orientation.

Figures 30, 31, 32:
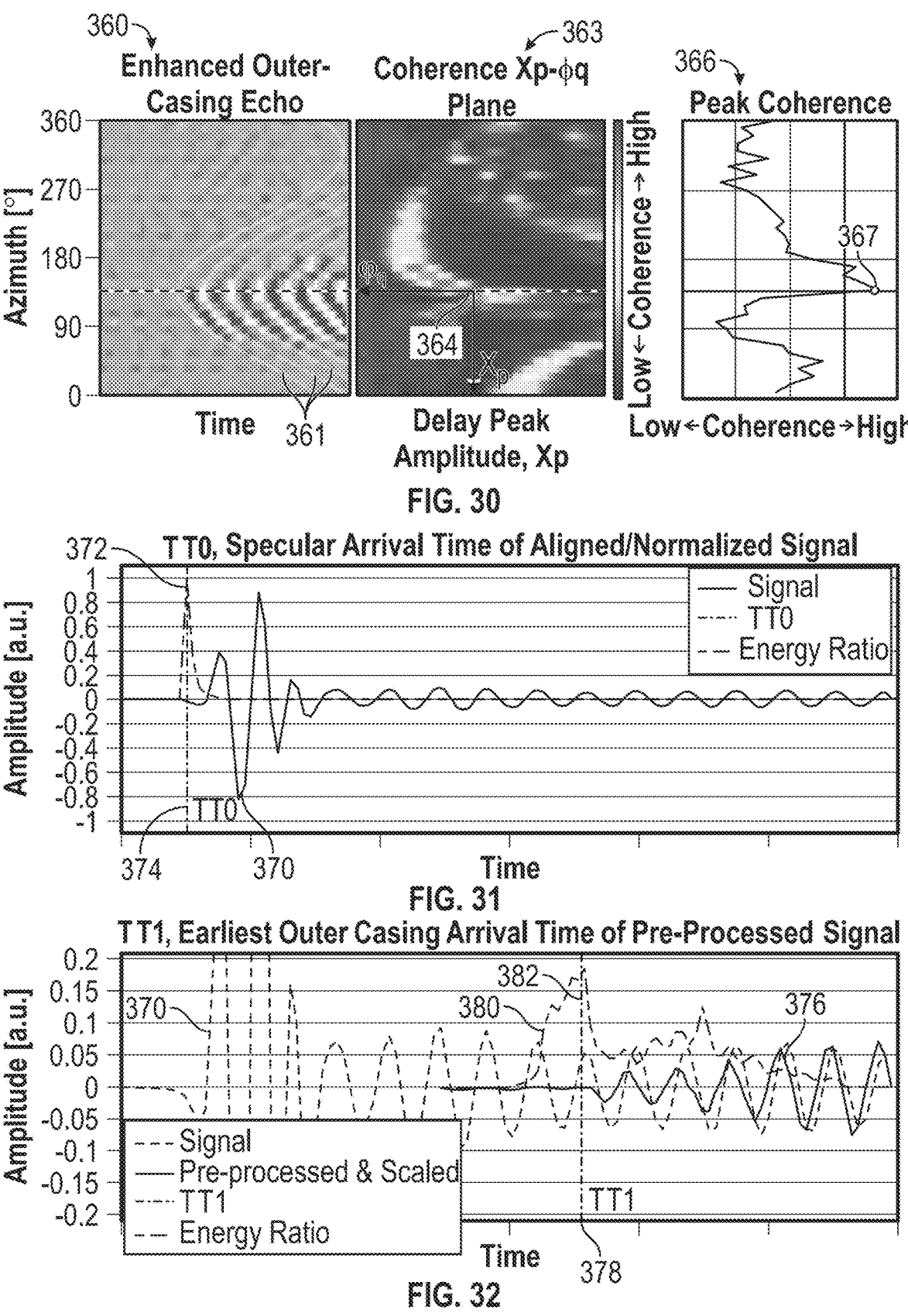
FIG. 30 presents example coherence computation results in the p-q plane using different well data from FIGS. 27-29.
FIGS. 31 and 32 are graphs respectively showing an example specular echo arrival time and outer casing signal arrival time detection results from respective peak energy-ratio, each depicting one or more aspects of the present disclosure.

FIG. 30 presents example pre-processed pulse-echo signals to enhance outer casing arrivals in VDL image 360 (left), with a model move-out profiles that provided the highest coherence peak (white solid line) positioning in inversed polarity 361 and in multiple curves offset in the horizontal axis at the time period that is inversely proportional to the inner tubular resonance frequency.

Move-out $\hat{D}_n$, that maximizes coherence of beam-formed signals, is presented in inversed polarity to control the quality of eccentricity estimation. White lines 361 in the left-most graph in FIG. 30 are the examples, and they are repeatedly drawn with the time offset identical to the inverse of inner tubular resonance frequency to highlight the match between the profile and outer casing arrivals visible in the VDL plots 360. From the coherence data presented in the p-q plane 363, one can identify the eccentering parameters $[X_p, \varphi_q]$ 364 at which the coherence value takes the maximum. The right most graph 366 presents the maximum coherence found in p-q plane 363, being projected on the azimuth. Maximum value is found at the azimuth shown in the dashed line 367.

Eccentricity Estimation—Statistical Refinement (Optional)

Ultrasonic signals are acquired at relatively fine spatial spacing or resolution, for example, in the order from 0.1 inches to a couple of inches, in which the inner tubular eccentricity may present negligible variation in the order of a couple of feet of one casing or tubular section. Eccentricity and its direction acquired in the order of foot can be statistically processed over the sample of, 10 to 1000 depending on actual data acquisition spacing and improve their reliability. Statistical processing includes median, arithmetic average or histogram mode, which could be applied after outlier rejection referring the standard deviations.

In case two tools providing ultrasonic pulse-echo and dipole measurements are connected in one tool string, tool string can be rotated relative to the dual-string eccentering direction while logging. Due to the measure points that are offset along the tool, eccentering direction from the ultrasonic measurement relative to the tool reference 141 orientation may not be valid when dipole measurement at the same depth, due to possible tool rotation in the time interval of the two measurements, which can be in the order of seconds. To minimize the effect of the tool rotation, one can add sensors that provide the tool rotation or tool orientation in the well, for examples, gyroscope and 3-axis accelerometers in the ultrasonic or/and sonic tools or in an additional tool string.

Arrival Time Estimation from Moving-Window Energy Ratio

Among the azimuthal signals 230, there may be at least one signal that clearly presents the outer casing arrival under the presence of residual inner tubular ringing. By providing the casing arrival time TTa of one waveform at azimuth index n in FIG. 6, we can estimate the absolute minimum and maximum arrival time represented respectively as TT1 and TT2. A method of detecting ultrasonic signal arrival time under the presence of noise, as described herein, the outer casing arrival or break time detection, is according to one or more aspects described in EP. Pat. No. EP2757391 (A3), the entirety of which is hereby incorporated herein by reference. This is one example, and it will not limit applying alternative statistical arrival estimate techniques (e.g., Akaike or Bayesian criterion) for sonic or seismic signal arrival detection, or their example uses as described in U.S. Pat. No. 7,423,930, the entirety of which is hereby incorporated herein by reference.

Energy ratio, ERn(k), at azimuth n and at sample time index k, can be expressed as set forth below in Equation (25).

$$ER_n(k) = \frac{\sum_{k}^{k+K} sr_n(t_k)^2}{\sum_{a-k}^{k} sr_n(t_k)^2 - \alpha \sum_{1}^{L} sr_n(t_k)^2} \tag{25}$$

FIG. 31 presents using the aligned and normalized signal 370 at the eccentering azimuth $\varphi_q$ to determine specular echo arrival time TT0 at the peak 374 of the energy ratio presented as a long-dashed curve 372. FIG. 32 presents scaled original signal 370 in dashed line curve and the pre-processed signal 376, that contains the outer-casing arrivals at the eccentering azimuth $\varphi_q$, in a curve, from which first break of the outer casing arrival time TT1 378 is detected at the peak 382 of the energy ratio presented in a long-dashed curve 380. From measured TT1 378, eccentering parameters $[X_p, \varphi_q]$ and Equation (1), one can obtain the outer casing break time TT1 at the eccentering direction. Using Equation (2), one can obtain the outer casing break time TT2 at the azimuth opposite to the eccentering direction.

Substituting TT1, TT2 obtained as per methods detailed above and OD (the nominal outer diameter of the inner tubular) and ID (the nominal inner diameter of the outer casing) values in the Equation (3), one can obtain the compressional wave propagation velocity Vp of in the A-annulus 164. From the eccentricity parameter Xp and Vp, one can compute the eccentricity value ECC using the Equation (24).

Requirement for Pulse-Echo Signal Acquisition Duration

In general, pulse-echo signals for cement quality and casing corrosion evaluation are acquired over relatively short duration, in which the outer casing echo may not be necessarily present depending on the eccentricity value and wave propagation speed in A-annulus Vp. Signal acquisition must last over the time period that includes the outer casing echo arrivals at least more than 1 cycle at least more than 1 azimuthal directions. Such duration can be computed from geometrical dimensions of the dual string and anticipated wave propagation speed of the material in A-annulus 164.

A possible advantage of coherence determination from move-out signals, compensated for outer casing eccentricity, is that relatively short acquisition signals, with half-missing outer casing arrivals from the far side, can be tolerated to estimate eccentricity. Combining the first arrival time of eccentered direction and coherence-based eccentricity estimation can provide quantitative eccentricity estimation from pulse-echo measurements.

Figure 33:
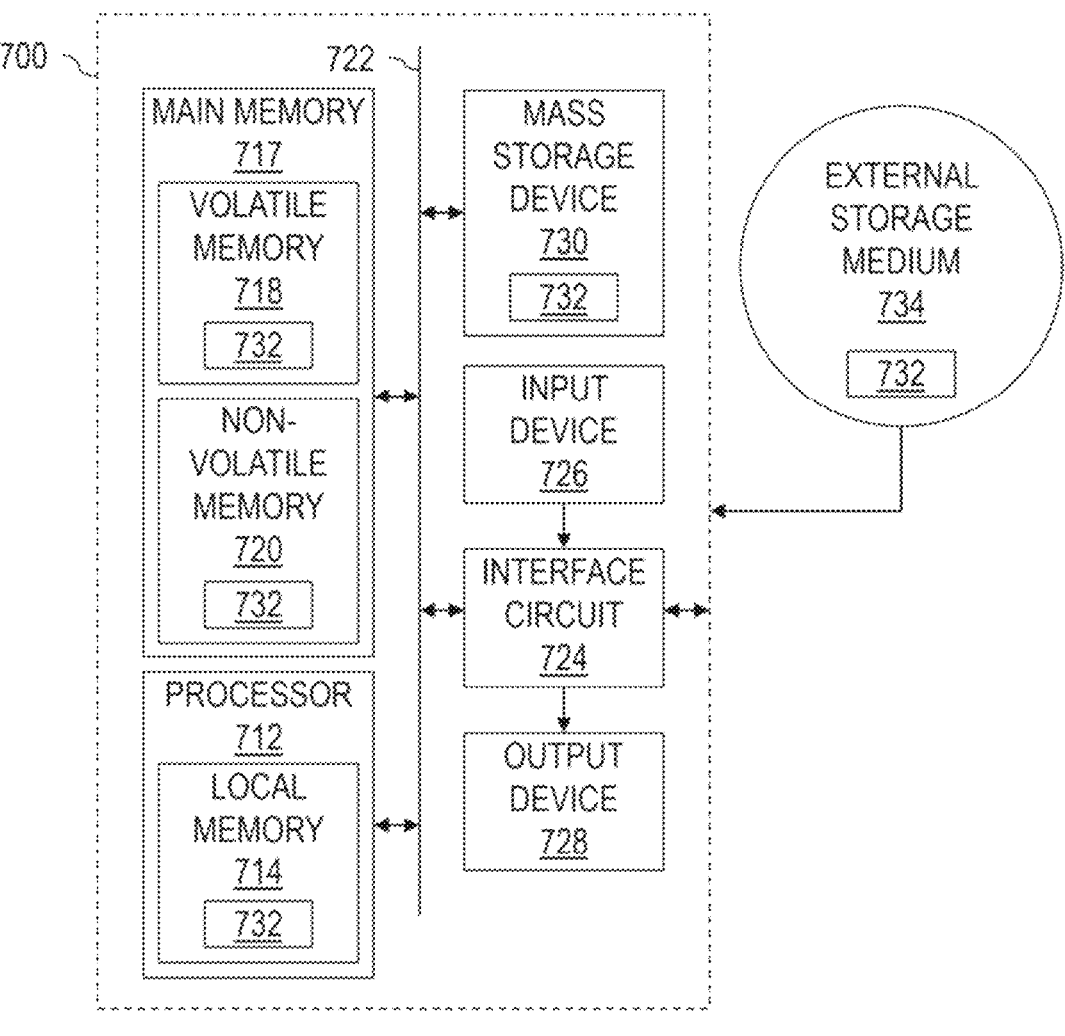
FIG. 33 is a schematic view of at least a portion of an example implementation of apparatus according to one or more aspects of the present disclosure.

FIG. 33 is a schematic view of at least a portion of an example implementation of a processing system 700 according to one or more aspects of the present disclosure. The processing system 700 may execute machine-readable instructions to implement at least a portion of one or more of the methods and/or processes described herein, and/or to implement a portion of one or more of the example downhole tools and/or surface equipment described herein. The processing system 700 may be or comprise, for example, one or more processors, controllers, special-purpose computing devices, servers, personal computers, personal digital assistant (PDA) devices, smartphones, internet appliances, and/or other types of computing devices. The entirety of the processing system 700 may be implemented within downhole apparatus described above. One or more components or functions of the processing system 700 may also or instead be implemented in wellsite surface equipment, perhaps including the surface equipment 132 depicted in FIG. 1 and/or other surface equipment.

The processing system 700 may comprise a processor 712, such as a general-purpose programmable processor, among other examples. The processor 712 may comprise a local memory 714 and may execute program code instructions 732 present in the local memory 714 and/or another memory device. The processor 712 may execute, among other things, machine-readable instructions or programs to implement the methods and/or processes described herein. The programs stored in the local memory 714 may include program instructions or computer program code that, when executed by an associated processor, cause a controller and/or control system implemented in surface equipment and/or a downhole tool to perform tasks as described herein. The processor 712 may be, comprise, or be implemented by one or more processors of various types operable in the local application environment, and may include one or more general-purpose processors, special-purpose processors, microprocessors, DSPs, FPGAs, ASICs, processors based on a multi-core processor architecture, and/or other processors.

The processor 712 may be in communication with a main memory 717, such as via a bus 722 and/or other communication means. The main memory 717 may comprise a volatile memory 718 and a non-volatile memory 720. The volatile memory 718 may be, comprise, or be implemented by random access memory (RAM), static RAM (SRAM), dynamic RAM (DRAM), synchronous DRAM (SDRAM), RAMBUS DRAM (RDRAM), and/or other types of RAM devices. The non-volatile memory 720 may be, comprise, or be implemented by read-only memory, flash memory, and/or other types of memory devices. One or more memory controllers (not shown) may control access to the volatile memory 718 and/or the non-volatile memory 720.

The processing system 700 may also comprise an interface circuit 724. The interface circuit 724 may be, comprise, or be implemented by various types of standard interfaces, such as an Ethernet interface, a universal serial bus (USB), a wireless interface, and/or a cellular interface, among other examples. The interface circuit 724 may also comprise a graphics driver card. The interface circuit 724 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 726 may be connected to the interface circuit 724. One or more of the input devices 726 may permit a user to enter data and/or commands for utilization by the processor 712. Each input device 726 may be, comprise, or be implemented by a keyboard, a mouse, a touchscreen, a trackpad, a trackball, an image/code scanner, and/or a voice recognition system, among other examples.

One or more output devices 728 may also be connected to the interface circuit 724. One or more of the output devices 728 may be, comprise, or be implemented by a display device, such as a liquid crystal display (LCD), a light-emitting diode (LED) display, and/or a cathode ray tube (CRT) display, among other examples. One or more of the output devices 728 may also or instead be, comprise, or be implemented by a printer, speaker, and/or other examples.

The processing system 700 may also comprise a mass storage device 730 for storing machine-readable instructions and data. The mass storage device 730 may be connected to the interface circuit 724, such as via the bus 722. The mass storage device 730 may be or comprise a floppy disk drive, a hard disk drive, a compact disk (CD) drive, and/or digital versatile disk (DVD) drive, among other examples. The program code instructions 732 may be stored in the mass storage device 730, the volatile memory 718, the non-volatile memory 720, the local memory 714, and/or on a removable storage medium 734, such as a CD or DVD.

The mass storage device 730, the volatile memory 718, the non-volatile memory 720, the local memory 714, and/or the removable storage medium 734 may each be a tangible, non-transitory storage medium. The modules and/or other components of the processing system 700 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method for processing signals, comprising:

obtaining, by a pulse-echo tool conveyed in a borehole of a well, data for evaluation, wherein the pulse-echo tool comprises a tool face and at least one ultrasonic transducer rotating relative to the tool face, and wherein the data includes pulse-echo signals acquired at a plurality of circumferential positions of the borehole or at a plurality of acquisition azimuths of the borehole;

conducting a pre-processing evaluation of the data obtained to achieve a pre-processed data set by aligning the pulse-echo signals based on an inner tubular echo arrival time, wherein the pulse-echo signals are transmitted and received by the ultrasonic transducer;

determining a third interface echo arrival time for the pre-processed data set;

preparing at least one model-based delay profile of eccentricities in the pre-processed data set;

back-propagating the pre-processed data set according to each of the model-based delay profiles to compensate for an eccentricity-dependent delay of an outer casing echo and generate one or more back-delayed signals;

computing a coherence of back-delayed signals derived from the pre-processed data set for the at least one model-based delay profile;

selecting a delay profile providing a maximum coherence of data;

determining an absolute value of echo arrival time, at least at one evaluation azimuth of the selected delay profile;

determining a wave propagation velocity from the determined absolute value of echo arrival time and the at least at one evaluation azimuth of the selected delay profile;

determining an eccentricity based upon the determined wave propagation velocity; and outputting at least one of the eccentricity or the wave propagation velocity for use in evaluating the borehole.

2. The method according to claim 1, wherein the data for evaluation further includes wellbore geometrical parameters.

3. The method according to claim 2, wherein conducting the pre-processing evaluation enhances features of the pulse-echo signals of the third interface echo and reduces features of the pulse-echo signals of the inner tubular.

4. The method according to claim 2, wherein a pulse-echo beam is formed to enhance features of the pulse-echo signals of the third interface echo with respect to features of the pulse-echo signals of the inner tubular.

5. The method according to claim 1, wherein numerical forward modeling is used in the method.

6. The method according to claim 5, wherein the numerical forward modeling is one of a ray-tracing analysis, finite element analysis, a finite difference analysis, a spectral element analysis, and a semi-analytical green function-based analysis.

7. A method for processing ultrasonic-based signals for data preparation for eccentricity estimation, comprising:

extracting, by a pulse-echo tool conveyed in a cased wellbore, at least one pulse-echo signal, at least at one acquisition azimuth, and at least at one depth in the cased wellbore, wherein the pulse-echo tool comprises a tool face and at least one ultrasonic transducer rotating relative to the tool face;

determining an inner tubular echo signal envelope peak amplitude and a time providing a same feature of the echo signal, at least including a closest zero-crossing to a peak for each signal extracted;

aligning each of the extracted pulse-echo signals referring to the time of the same feature to achieve a pre-processed data set, wherein the pulse-echo signals are transmitted and received by the ultrasonic transducer;

normalizing each of the extracted pulse-echo signals using the envelope peak amplitude;

enhancing third interface echo signals by reducing the inner tubular specular echo and inner tubular ringing;

preparing at least one model-based delay profile of eccentricities in the pre-processed data set;

back-propagating the pre-processed data set according to each of the model-based delay profiles to compensate for an eccentricity-dependent delay of an outer casing echo and generate one or more back-delayed signals;

estimating pipe eccentricity data based on the enhanced third interface echo signals and the normalized pulse-echo signals, wherein the pipe eccentricity data includes at least one of an inner tubular eccentricity, an azimuthal direction and a wave propagation speed of annular material; and outputting the estimated pipe eccentricity data for use in evaluating a borehole.

8. The method for processing ultrasonic-based signals according to claim 7, further comprising after outputting the estimated pipe eccentricity data, returning the extracting the pulse-echo signals in a cased wellbore at different depth and performing the method again.

9. The method according to claim 7, wherein extracting the at least one pulse-echo signal at the at least one depth in the wellbore includes performing a band-pass filtering to the signal to increase sensitivity to a resonance of the inner tubular.

10. The method according to claim 7, wherein the aligning of each of the extracted pulse-echo signals includes applying a time shift to each of the signals.

11. The method according to claim 7, wherein the method is performed at least in one of a single-string cased wellbore and a dual-string cased wellbore.

12. The method according to claim 7, wherein numerical forward modeling is used in the method, and wherein the numerical forward modeling is one of a ray-tracing analysis, a finite element analysis, a finite difference analysis, a spectral element analysis, and a semi-analytical green function-based analysis.

13. An article of manufacture having a non-volatile memory, the non-volatile memory configured to store a list of instructions, the list of instructions comprising, at least in part, a method for processing signals that may be read and performed by a computing device, the method comprising:

obtaining, by a pulse-echo tool conveyed in a borehole of a well, data for evaluation, wherein the pulse-echo tool comprises a tool face and at least one ultrasonic transducer rotating relative to the tool face, and wherein the data includes pulse-echo signals acquired at a plurality of circumferential positions of the borehole or at a plurality of acquisition azimuths of the borehole;

conducting a pre-processing evaluation of the data obtained to achieve a pre-processed data set by aligning the pulse-echo signals based on an inner tubular echo arrival time, wherein the pulse-echo signals are transmitted and received by the ultrasonic transducer;

determining a third interface echo arrival time for the pre-processed data set;

preparing at least one model-based delay profile of eccentricities in the pre-processed data set;

back-propagating the pre-processed data set according to each of the model-based delay profiles to compensate for an eccentricity-dependent delay of an outer casing echo and generate one or more back-delayed signals;

computing a coherence of back-delayed signals derived from the pre-processed data set for the at least one model-based delay profile;

selecting a delay profile providing a maximum coherence of data;

determining an absolute value of echo arrival time, at least at one evaluation azimuth of the selected delay profile;

determining a wave propagation velocity from the determined absolute value of echo arrival time and the at least at one evaluation azimuth of the selected delay profile;

determining an eccentricity based upon the determined wave propagation velocity; and outputting at least one of the eccentricity or the wave propagation velocity for use in evaluating the borehole.

14. The article of manufacture according to claim 13, wherein the article of manufacture is configured as one of a compact disk, a solid-state memory, a universal serial bus, and a computer hard disk.

15. The article of manufacture according to claim 13, wherein the method is performed such that conducting the pre-processing evaluation enhances features of the third interface echo.

16. The article of manufacture according to claim 13, wherein the method is performed such that a numerical forward modeling is used in the method.

17. The article of manufacture according to claim 16, wherein the method is performed such that the numerical forward modeling is one of a ray-tracing analysis, a finite element analysis, a finite difference analysis, a spectral element analysis, and a semi-analytical green function-based analysis.

\* \* \* \* \*